US012554292B2

(12) United States Patent
Choi

(10) Patent No.: US 12,554,292 B2
(45) Date of Patent: Feb. 17, 2026

(54) RECEPTACLE AND ELECTRONIC DEVICE INCLUDING THE SAME

(71) Applicant: SAMSUNG ELECTRONICS CO., LTD., Suwon-si (KR)

(72) Inventor: Junhwa Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 142 days.

(21) Appl. No.: 18/480,050

(22) Filed: Oct. 3, 2023

(65) Prior Publication Data

US 2024/0045481 A1    Feb. 8, 2024

Related U.S. Application Data

(63) Continuation of application No. PCT/KR2022/005174, filed on Apr. 11, 2022.

(30) Foreign Application Priority Data

Apr. 14, 2021    (KR) .......................... 10-2021-0048649

(51) Int. Cl.
G06F 1/16    (2006.01)

(52) U.S. Cl.
CPC .......... G06F 1/1684 (2013.01); G06F 1/1656 (2013.01)

(58) Field of Classification Search
CPC ........ G06F 1/1656; G06F 1/182; G06F 1/181; G06F 1/1684; G06F 1/16; H01R 13/5213;
(Continued)

(56) References Cited

U.S. PATENT DOCUMENTS

| 4,952,170 A | 8/1990 | Pritulsky |
| 7,670,156 B2 * | 3/2010 | Chen .................. H01R 13/6485 439/607.05 |

(Continued)

FOREIGN PATENT DOCUMENTS

| CN | 103296520 A | 9/2013 |
| CN | 203386960 U | 1/2014 |

(Continued)

OTHER PUBLICATIONS

European Search Report for EP22788364.2 dated Jul. 8, 2024.
Korean Office Action for Korean Patent Application No. KR10-2021-0048649, dated Aug. 29, 20025.

*Primary Examiner* — Dimary S Lopez Cruz
(74) *Attorney, Agent, or Firm* — CANTOR COLBURN LLP

(57)    ABSTRACT

An electronic device includes a housing which defines an external device connector hole, and a receptacle connected to the housing at the external device connector hole and openable and closeable. The receptacle includes a first metal member including an electrical connection part exposed to outside the first metal member in a direction away from the external device connector hole, and a door cover which faces the first metal member, is rotatably coupled to the housing at the external device connector hole, and rotatable relative to the first metal member. The receptacle which is open includes the door cover rotated away from the first metal member and the connection part connectable to an external device plug, and the receptacle which is closed includes the door cover rotated toward the first metal member and the connection part unconnectable to the external device plug.

20 Claims, 18 Drawing Sheets

(58) Field of Classification Search
CPC .............. H01R 13/453; H01R 13/4532; H01R 13/4536; H01R 13/447; H01R 13/627; H01R 13/6272; H01R 13/6271; H01R 2201/06; H01R 24/62; H01R 24/60
USPC ................ 361/679.55, 679.02; 439/136–147
See application file for complete search history.

(56) References Cited

U.S. PATENT DOCUMENTS

| | | |
|---|---|---|
| 8,535,097 B2 | 9/2013 | Yen |
| 8,986,023 B2 * | 3/2015 | Lee ..................... H01R 13/447 439/138 |
| 2010/0248554 A1 | 9/2010 | Hung et al. |
| 2010/0297892 A1 | 11/2010 | Ando et al. |
| 2010/0304587 A1 | 12/2010 | Fukushi |
| 2013/0034985 A1 * | 2/2013 | Lin ..................... H01R 13/447 439/347 |
| 2013/0130524 A1 | 5/2013 | Wang |
| 2013/0231010 A1 | 9/2013 | Liang et al. |
| 2014/0134858 A1 | 5/2014 | Tseng et al. |
| 2015/0044906 A1 | 2/2015 | Tian et al. |
| 2015/0064953 A1 | 3/2015 | Iwatani |
| 2015/0270661 A1 | 9/2015 | Kao et al. |
| 2017/0271820 A1 | 9/2017 | Ho |

FOREIGN PATENT DOCUMENTS

| | | |
|---|---|---|
| CN | 203398383 U | 1/2014 |
| CN | 203398424 U | 1/2014 |
| CN | 203415734 U | 1/2014 |
| CN | 203674480 U | 6/2014 |
| CN | 112425008 A | 2/2021 |
| JP | 3134744 U | 8/2007 |
| JP | 4793471 B2 | 8/2011 |
| JP | 2015035940 A | 2/2015 |
| JP | 6193060 B2 | 8/2017 |
| JP | 2020035532 A | 3/2020 |
| JP | 6914514 B2 | 7/2021 |
| KR | 0159508 B1 | 12/1998 |
| KR | 0167469 B1 | 1/1999 |
| KR | 20100117593 A | 11/2010 |
| KR | 101125869 B1 | 3/2012 |
| KR | 101218245 B1 | 1/2013 |
| KR | 20170005141 A | 1/2017 |
| KR | 200483660 Y1 | 6/2017 |
| KR | 20180065858 A | 6/2018 |
| KR | 101975818 B1 | 5/2019 |

* cited by examiner

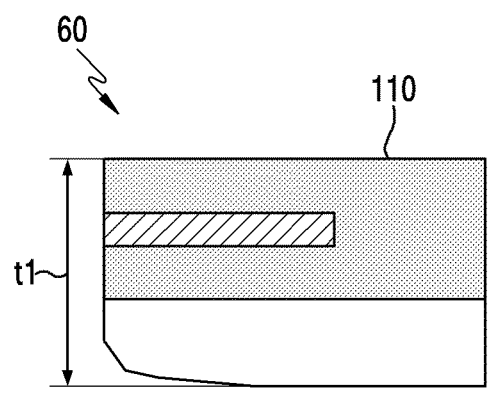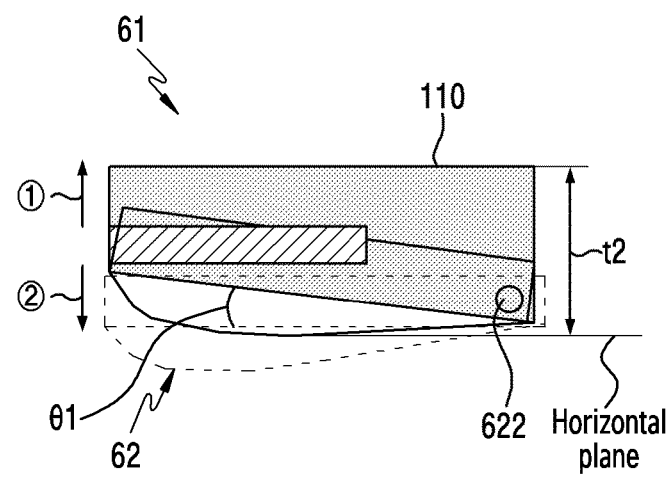
FIG.3A
[PRIOR ART]
FIG.3B

RECEPTACLE AND ELECTRONIC DEVICE INCLUDING THE SAME

CROSS-REFERENCE TO RELATED APPLICATIONS

This application is a continuation application of International Application No. PCT/KR2022/005174 designating the United States, filed on Apr. 11, 2022, at the Korean Intellectual Property Receiving Office and claiming priority to Korean Patent Application No. 10-2021-0048649, filed on Apr. 14, 2021, at the Korean Intellectual Property Office, the disclosures of which are incorporated by reference herein in their entireties.

BACKGROUND

(1) Field

Various embodiments of the present invention relate to a receptacle which electrically connects an electronic device to a device external to the electronic device (e.g., an external device).

(2) Description of the Related Art

An electronic device such as laptop computers or tablet personal computers (PCs) can have at least one or more connector holes formed (or provided) in a side member of the electronic device to be connected to an external device external to the electronic device. A connection part (e.g., plug) of the external device is connected to a connection part (e.g., receptacle) arranged inside the electronic device, through a connector hole, to electrically connect the external device to the electronic device and to provide mutual signal transmission/reception and/or electrical charging of the electronic device and/or the external device.

SUMMARY

It may be difficult to reduce an overall thickness and slim down an electronic device having the receptacle for receiving the connection part of an external device. For example, in an electronic device, it can be difficult to slim down a housing of the electronic device due to the mounting (e.g., a mounting thickness) of a connection socket of the receptacle.

According to various embodiments of the present invention, a receptacle which reduces a thickness of a housing of an electronic device, and an electronic device including the same may be provided.

According to various embodiments of the present invention, a receptacle capable of ground (GND) and/or electromagnetic interference (EMI)/electrostatic discharge (ESD) shielding, and an electronic device including the same may be provided.

According to various embodiments of the present invention, an electronic device may include a housing which includes a front cover arranged to face a first direction, a rear cover arranged to face a second direction opposite to the first direction, a side member arranged to surround at least a part of the space between the front and rear covers and including a connector hole, and a receptacle at least a portion of which is rotatably assembled on the rear cover, and which is arranged at an entrance of the connector hole. The receptacle may include a first metal member including a plurality of connection pins, and including a protruding connection part connected to a plug, a door cover which is arranged to face the first metal member, and rotates towards the second direction around a hinge axis when the plug is connected to the protruding connection part, and rotates towards the first direction around the hinge axis when the connected plug becomes separated, and a second metal member which faces the first metal member, and is coupled to the door cover.

According to various embodiments of the present invention, it may be advantageous to slim down an electronic device such as a laptop computer, for example, a notebook computer or a tablet PC.

According to various embodiments of the present invention, a metal member having a plurality of connection pins is configured to contact with a rear metal member, whereby the grounding of a plug is possible and EMI shielding may be possible.

According to various embodiments of the present invention, since a rotatable door cover may have a structure separable from a housing, automatic optical inspection is easy, and manual soldering is easy.

According to various embodiments of the present invention, the grounding of the connected plug is possible and EMI shielding is possible, thereby improving Wi-Fi performance and enabling high-speed data transmission (e.g., transmission rate of 5 Gbps/10 Gbps/48 Gbps).

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 3A and 3B are cross-sectional views respectively illustrating a receptacle according to various embodiments of the present invention and a receptacle of a comparative embodiment.

DETAILED DESCRIPTION

Figure 1:
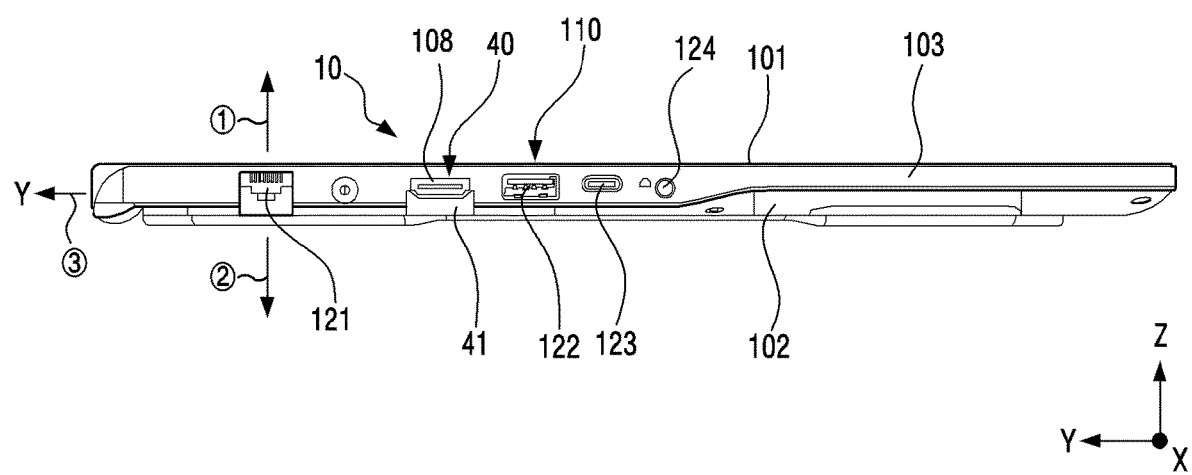
FIG. 1 is a cross-sectional side view of an electronic device according to various embodiments.

Hereinafter, various embodiments of the present invention will be described in detail with reference to the accompanying drawings.

Hereinafter, various embodiments of the present invention will be described with reference to the accompanying drawings. However, it should be understood that this does not intend to limit the present disclosure to specific embodiments, and includes various modifications, equivalents, and/or alternatives of the embodiments of the present disclosure. In connection with the description of the drawings, like reference numerals may be used for like components.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. Within the Figures and the text of the disclosure, a reference number indicating a singular form of an element may also be used to reference a plurality of the singular element. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
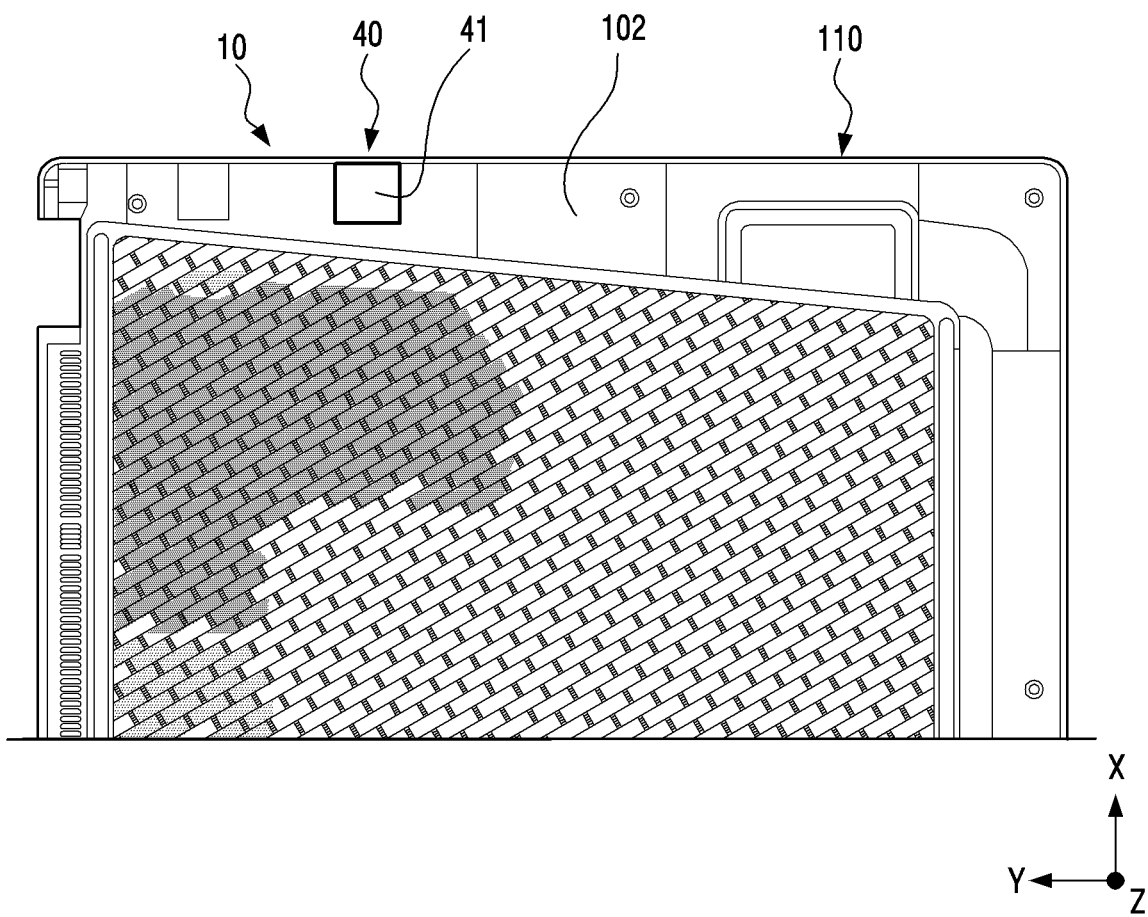
FIG. 2 is a bottom plan view of a rear surface of the electronic device of FIG. 1.

FIG. 1 is a cross-sectional side view illustrating an electronic device 10 according to various embodiments. FIG. 2 is a bottom plan view illustrating a part of a rear surface of the electronic device 10 according to various embodiments.

Referring to FIG. 1 and FIG. 2, the electronic device 10 of various embodiments may include at least one of a smart phone, a tablet personal computer (PC), a mobile phone, a video phone, an e-book reader (e-book reader), a desktop personal computer, a laptop personal computer, a netbook computer, a workstation, a server, a personal digital assistant (PDA), a portable multimedia player (PMP), an MP3 player, a mobile medical device, a camera, or a wearable device (e.g., smart glasses, head-mounted-device (HMD)), an electronic clothing, an electronic bracelet, an electronic necklace, an electronic appcessory, an electronic tattoo, a smart mirror, or a smart watch.

The electronic device 10 shown in FIG. 1 and FIG. 2 may be a laptop PC. Hereinafter, an embodiment in which a receptacle 40 of the present invention is applied to the laptop PC will be described. For example, the laptop PC is a notebook type computer, and may include two housings and a hinge device which physically connect the two housings to each other. The receptacle 40 may be arranged in one housing 110 among the two housings.

According to various embodiments, the electronic device 10 may include the housing 110 accommodating a plurality of various parts of the electronic device 10. According to various embodiments, the housing 110 may include a front cover 101, a rear cover 102, and a side member 103 which together constitute an exterior of the electronic device 10. According to various embodiments, the housing 110 may include the front cover 101 arranged to face a first direction (①), the rear cover 102 arranged to face a second direction (②) facing an opposite direction to the first direction (①), and the side member 103 arranged to face a third direction (③) crossing each of the first and second directions (①, ②) such as being vertical (e.g., perpendicular to) the first and second directions (①, ②). The front cover 101 and the rear cover 102 which face each other may define a space therebetween, and the side member 103 may enclose the space between the front cover 101 and the rear cover 102.

According to various embodiments, a plurality of connectors to be electrically connected to a device external to the electronic device 10 (e.g., an external device) may be arranged on the side member 103 of the housing 110. For example, a LAN port 121, the receptacle 40, a USB port 122, an external device connection port 123, and a power adapter port 124 may be arranged along a length of the side member 103 (e.g., along the Y direction).

According to various embodiments, the receptacle 40 may be arranged at an entrance of a connector hole 108 formed (or provided) in the side member 103. The connector hole 108 may be exposed to outside the electronic device 10 according to various states of the receptacle 40. According to various embodiments, the receptacle 40 may include a door cover 41 that rotates. That is, the door cover 41 may be rotatable relative to the receptacle 40 and/or other parts of the electronic device 10. According to various embodiments, the door cover 41 may be arranged or rotated to be accommodated in the rear cover 102 of the housing 110 and to include a surface of the door cover 41 exposed to outside the receptacle 40 and/or the electronic device 10.

According to various embodiments, at least a portion of the front cover 101 may be formed or provided by a substantially transparent cover (e.g., a glass plate including various coating layers, or a polymer plate). According to the embodiment, the front cover 101 may include a first surface (e.g., a major surface extended along an X-Y plane, facing the first direction (like the upward direction ①) and having a plurality of side edges), and a curved portion that is bent from at least one side edge of the first surface and toward a second surface (e.g., a major surface extended along an X-Y plane and facing the second direction (e.g., like the downward direction ②)), such that the curved portion may be bent extended from the first surface seamlessly.

According to various embodiments, the rear cover 102 may be formed by a substantially opaque cover. The rear cover 102 may be formed, for example, of coated or tinted glass, ceramic, polymer, metal (e.g., aluminum, stainless steel (STS), or magnesium), or a combination of at least two of the aforementioned materials.

According to various embodiments, the side member 103 is coupled with the front cover 101 and the rear cover 102, and may be formed by a side bezel structure (or "side wall") including metal and/or polymer. In some embodiment, the rear cover 102 and the side bezel structure may be integrally formed and include the same material (e.g., a metal material such as aluminum).

FIGS. 3A and 3B are cross-sectional views respectively illustrating a receptacle 61 according to various embodiments of the present invention and a receptacle 60 of a comparative embodiment. FIG. 3A may represent a closed state of the receptacle 60 of the comparative embodiment.

Referring to FIG. 3A, an upper thickness together with a lower thickness of the receptacle 60 of the comparative embodiment is referred to as a first thickness (t1), where the upper thickness may represent a comparative rear cover while the lower thickness may represent a comparative door cover. Referring to FIG. 3B, an upper thickness together with a lower thickness of the receptacle 61 of various embodiments is referred to as a second thickness (t2), where the lower thickness may be represented by a portion of the door cover 62 which extends further than the rear cover 102 in a downward direction. The first thickness and the second thickness may be a total thickness of the upper and lower thickness portions. The total thickness may be defined as maximum dimension occupied by the upper and lower thicknesses along a thickness direction of the electronic device 10 (e.g., the Z direction).

When a door cover 62 is in an opened state (dotted line in FIG. 3B), the first thickness (t1) of the comparative receptacle and the second thickness (t2) in the closed state of the receptacle 61 according to one or more embodiment are approximately the same. However, when the door cover 62 according to one or more embodiment is in a closed state (solid line in FIG. 3B), the second thickness (t2) may be smaller than the first thickness (t1) of the comparative closed state.

For example, when a male-type connector, for example, a plug is connected to the receptacle 61 by engagement of the plug with the receptacle 61, the door cover 62 may be rotated in a second direction (e.g., downward direction) from a closed position of the door cover 62, about a hinge axis 622. When the connected plug is disconnected from the receptacle 61 by disengagement of the plug from the receptacle 61, the door cover 62 may be rotated in a first direction (e.g., upward direction) with respect to the hinge axis 622.

According to various embodiments, the door cover 62 may be arranged to be rotatable within a first angle (θ1) about the hinge axis 622 at an entrance of a connector hole 108 in a portion of the rear cover 102 (shown in FIG. 2) of the electronic device 10. For example, the first angle (θ1) may be between about 0 degrees and about 5 degrees. The first angle may be defined as a difference of a reference of the door cover 62 in the maximally-open state and the reference in the maximally-closed state, such as relative to the rear cover 102, without being limited thereto.

Figure 4:
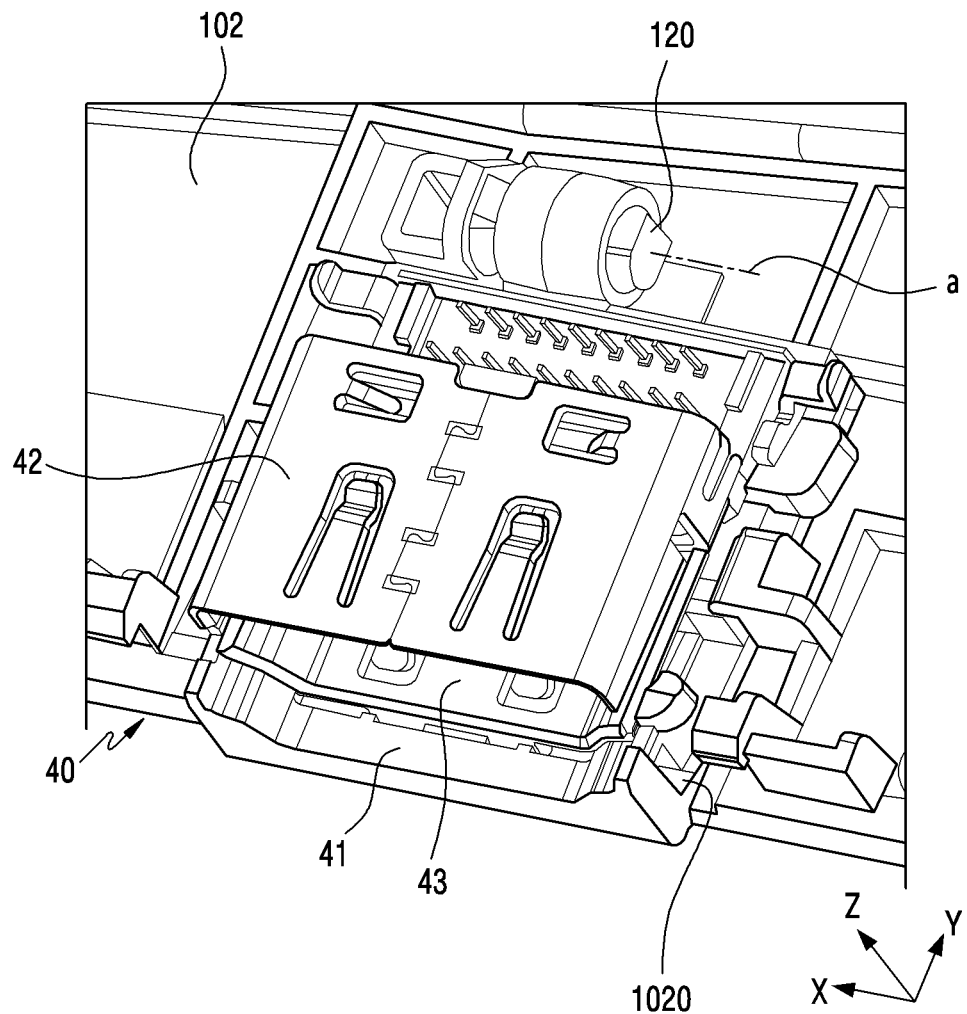
FIG. 4 is a perspective view illustrating a receptacle according to various embodiments of the present invention relative to a rear cover of an electronic device.

FIG. 4 is a perspective view illustrating a state in which the receptacle 40 is arranged on the rear cover 102 according to various embodiments of the present invention. In one or more embodiment, the receptacle 40 may be considered a part of the rear cover 102, such that the rear cover 102 may be referred to as including the receptacle 40. The front cover 101 and various internal components of the electronic device 10 are omitted in FIG. 4 for convenience of illustration.

Referring to FIG. 4, the receptacle 40 of various embodiments is a female-type connection device, and may be referred to as a jack or socket. According to various embodiments, the receptacle 40 is a connection device arranged at the entrance of the connector hole 108 (shown in FIG. 1) of the electronic device 10. The receptacle 40 may include a rotating door cover 41, and first and second metal members 42 and 43.

According to various embodiments, the receptacle 40 is arranged in a state of being accommodated in an opening 1020 formed in or defined by the rear cover 102. The receptacle may be parallel to a printed circuit board (not shown) of the electronic device 10. The first metal member 42 may be electrically and/or physically connected to the printed circuit board. That is, the receptacle 40 may be connected to the printed circuit board at the first metal member 42. The door cover 41 may rotate within a first angle (e.g., the first angle (θ1) shown in FIG. 3B) around a hinge axis (a). The hinge axis (a) in FIG. 4 may correspond to the hinge axis 622 illustrated in FIG. 3B.

The receptacle 40 may be open to outside the electronic device 10 along the Y direction, as shown in FIG. 4, by an entrance of the receptacle 40. An inner space defined in the receptacle 40 may be exposed to outside the electronic device 10, by an opening of the receptacle 40.

According to various embodiments, the receptacle 40 may include a hinge 120 on the rear cover 102. For example, the hinge 120 may provide the hinge axis (a). The door cover 41 may be connected to the hinge 120 to be rotatable around the hinge axis (a).

Figure 5:
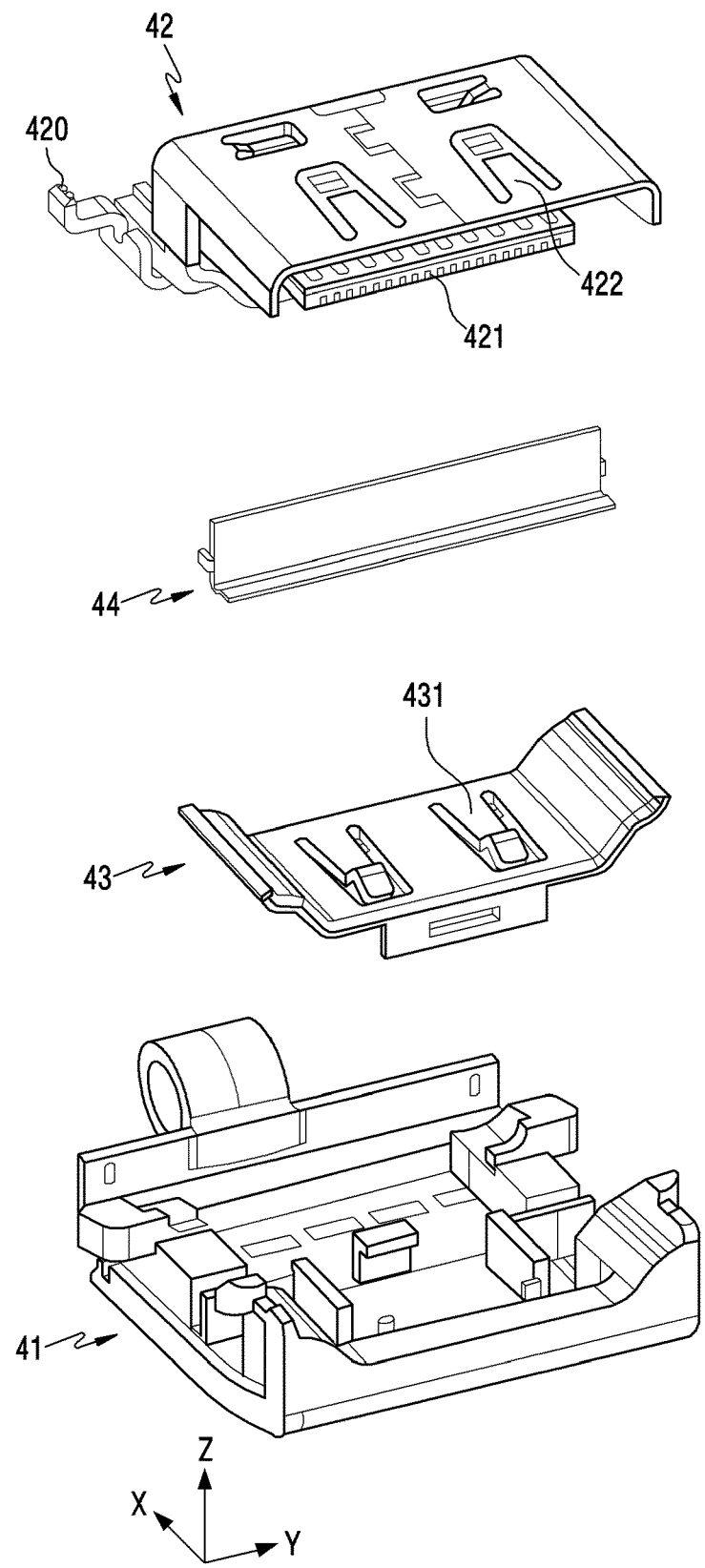
FIG. 5 is an exploded perspective view illustrating a receptacle according to various embodiments of the present invention.

FIG. 5 is an exploded perspective view illustrating a receptacle 40 according to various embodiments of the present invention.

Referring to FIG. 5, according to various embodiments, the receptacle 40 may include a door cover 41 and at least one metal members According to various embodiments, the metal member may be provided in plural including first to third metal members 42, 43 and 44. According to various embodiments, among the first to third metal members 42, 43 and 44, the first metal member 42 fixes the receptacle 40 to the housing 110 of the electronic device 10, such that the receptacle 40 is connected to the housing 110 at the first metal member 42. The second and third metal members 43 and 44 are fixed to the door cover 41 and thus, may be rotatable together with the door cover 41.

According to various embodiments, the first metal member 42 may be connected and fixed to the printed circuit board such as by soldering through a dip hole and a connection pad formed in the printed circuit board (not shown) fixedly arranged within the housing 110. The second and third metal members 43 and 44 may be to the door cover 41 rotatably arranged on the rear cover 102 (shown in FIG. 4), such as by a hooking structure. According to various embodiments, the first metal member 42 may include a fixing dip 420 at which the first metal member 42 is engaged with the printed circuit board. According to various embodiments, the fixing dip 420 is coupled to the dip hole (not shown) formed in the printed circuit board, whereby the first metal member 42 may be fixed within the housing 110 by a coupling structure of the fixing dip 420 and the front cover.

According to various embodiments, the first metal member 42 may include a protruding connection part 421 connectable to a plug of an external device. According to various embodiments, the protruding connection part 421 may be connected to an internal electric circuit through the connection pad of the printed circuit board. The protruding connection part 421 may be the part of the receptacle 40 at which the receptacle 40 is electrically connected to a connection pin of the inserted plug. For example, the protruding connection part 421 may protrude in a direction facing the connector hole 108.

According to various embodiments, the second metal member 43 may be coupled to the door cover 41 and be arranged to face the first metal member 42 along a thickness direction (e.g., Z direction). For example, depending on whether the door cover 41 is open or closed, a distance between the second metal member 43 and the first metal member 42 may increase by rotation of the door cover 41 in a second direction, or a distance between the second metal member 43 and the first metal member 42 may decrease by rotation of the door cover 41 in a first direction.

According to various embodiments, the third metal member 44 is coupled to the rear of the door cover 41 together with being in contact with the first metal member 42 to enhance an electrical ground function and provide an electromagnetic interference (EMI) shielding function. For example, the second and third metal members 43 and 44 may be made of or include SUS material. As being in contact, elements maybe be in physical contact such as to form an interface therebetween, in electrical contact (either directly or indirectly), etc.

According to various embodiments, when the plug is inserted into the receptacle 40, a first spring finger 422 of the first metal member 42 and a second spring finger 431 of the second metal member 43 may contact with a metal member of the plug, respectively, whereby it may be an elastic structure in which the ground of the electronic device and the ground of the plug are mutually conductive.

Figure 6:
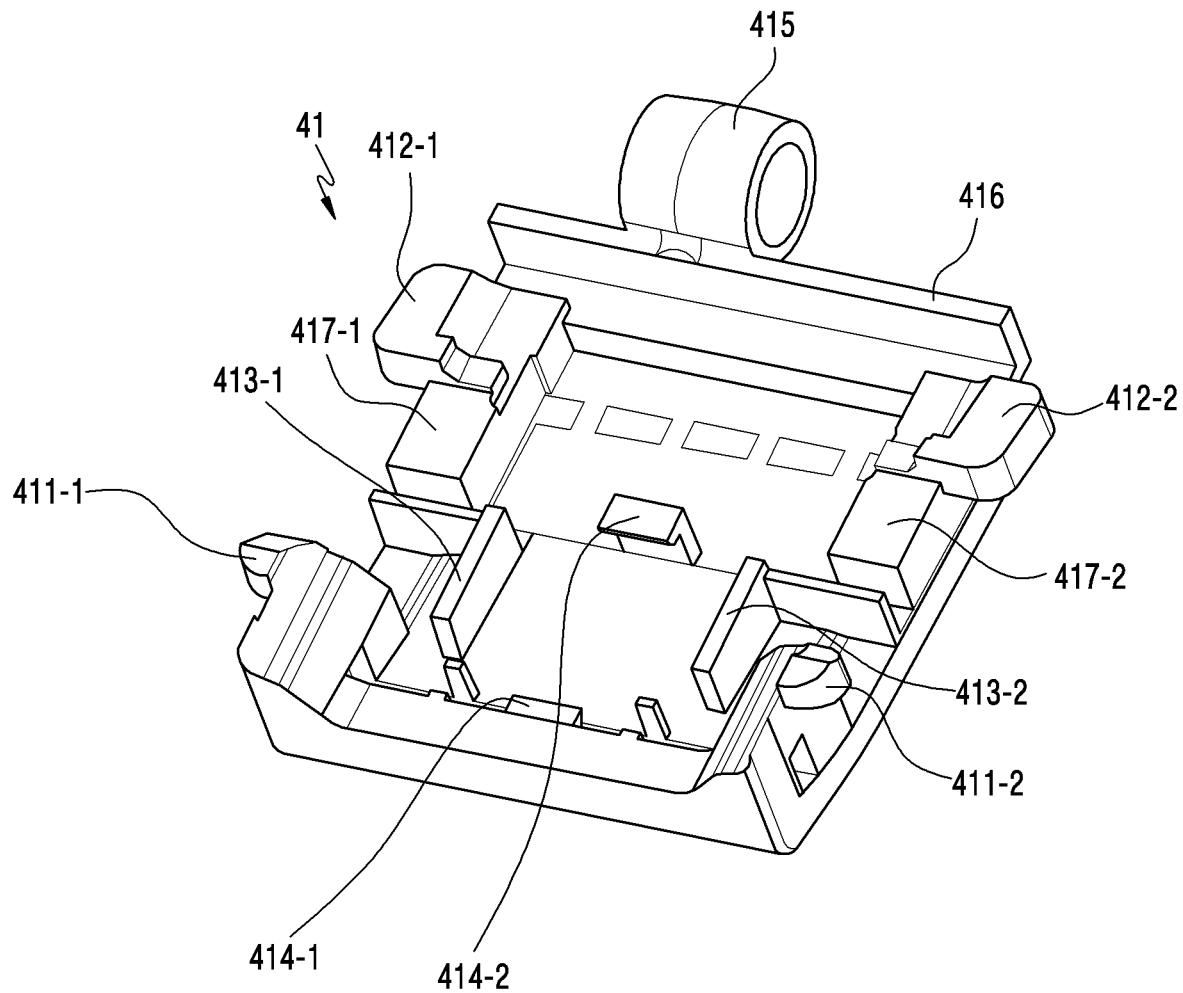
FIG. 6 is a perspective view illustrating a door cover of a receptacle according to various embodiments of the present invention.

FIG. 6 is a perspective view illustrating the door cover 41 according to various embodiments of the present invention.

Referring to FIG. 6, according to various embodiments, the door cover 41 is a member responsible for a decoration function (e.g., an exterior appearance at the receptacle 40) and support function, arranged to be rotatable around a hinge 120 (shown in FIG. 4) on a portion of the rear cover 102 which is close to or adjacent to the connector hole 108, and may be a seating member of the receptacle 40 at which the second metal member 43 is coupled to the door cover 41.

According to various embodiments, the door cover 41 may include at least one or more over-rotation prevention hooking protrusions 411-1, 411-2, 412-1, and 412-2 at one surface of the door cover 41 which facies a first direction (①) (shown in FIG. 3B). For example, among the over-rotation prevention hooking protrusions, at least one or more front over-rotation prevention hooking protrusions 411-1 and 411-2 may be arranged near the front of the door cover 41 (e.g., the front being furthest in the −Y direction of FIG. 4), and at least one or more rear over-rotation prevention hooking protrusions 412-1 and 412-2 may be formed near the back of the door cover 41 (e.g., the back being furthest in the Y direction of FIG. 4). According to various embodiments, when the door cover 41 rotates relative to the rear cover 102, each of the front and rear over-rotation prevention hooking protrusions 411-1, 411-2, 412-1 and 412-2 may suppress the movement of the door cover 41 by interlocking with a portion of the rear cover 102. In an embodiment, over-rotation of the door cover 41 in a direction away from the first metal member 42 is restricted by engagement of the hooking protrusions 411-1, 411-2, 412-1 and 412-2 of the door cover 41 with an edge portion of the rear cover 102 which defines the recess (e.g., the opening 1020).

According to various embodiments, the front over-rotation prevention hooking protrusions 411-1 and 411-2 of the door cover 41 may respectively protrude in opposite directions from each other, and the rear over-rotation prevention hooking protrusions 412-1 and 412-2 of the door cover 41 may also respectively protrude in opposite directions from each other.

According to various embodiments, where the door cover 41 has a center along the X direction, the over-rotation prevention hooking protrusion 411-1 located at the front of the door cover 41 may protrude in a direction away from the center of the door cover 41, and the over-rotation prevention hooking protrusion 412-1 located at the rear of the door cover 41 may also protrude in a direction away from the center of the door cover 41.

The door cover 41 may have a shape open in the first direction (①) along the thickness direction. According to various embodiments, the door cover 41 may include at least one or more seating protrusions 414-1 and 414-2 at which the second metal member 43 is coupled to the door cover 41. According to various embodiments, the door cover 41 may include at least one or more support protrusions 413-1 and 413-2 which faces a rear surface of and supports the second metal member 43 within the door cover 41. The seating protrusions 414-1 and 414-2 and the support protrusions 413-1 and 413-2 may be exposed to outside the door cover 41 at an inner area thereof.

According to various embodiments, at least one or more normal position hooking parts 417-1 and 417-2 may be formed between the front over-rotation prevention hooking protrusions 411-1 and 411-2 and the rear over-rotation prevention hooking protrusions 412-1 and 412-2, respectively, along the Y direction. Before the plug is inserted, a portion (e.g., a door locking protrusion 1023) of the rear cover 102 may be engaged with the normal position hooking parts 417-1 and 417-2 such that movement of the door cover 41 up to a normal (or vertical) position may be prevented.

According to various embodiments, the door cover 41 may include a standing type support wall 416 at which the third metal member 44 is coupled to the door cover 41. The support wall 416 is at the rear of the door cover 41, along the Y direction. The support wall 416 may include a hinge arm 415 at which the door cover 41 is connected to the hinge 120 formed on the rear cover 102. For example, since the door cover 41 is visible from outside the electronic device 10, the door cover 41 may be formed in various colors in consideration of a decoration function.

According to various embodiments, one surface (e.g., a lower surface) of the door cover 41 which faces a second direction (②) may be exposed to outside the rear cover 102 (shown in FIG. 4). For example, in consideration of a structure in which a part of the door cover 41 is exposed from the rear cover 102, the door cover 41 may be formed of variously colored injection-molded materials having a decoration function, or be formed of an injection-molded material having the same color as the rear cover 102.

Figure 7A:
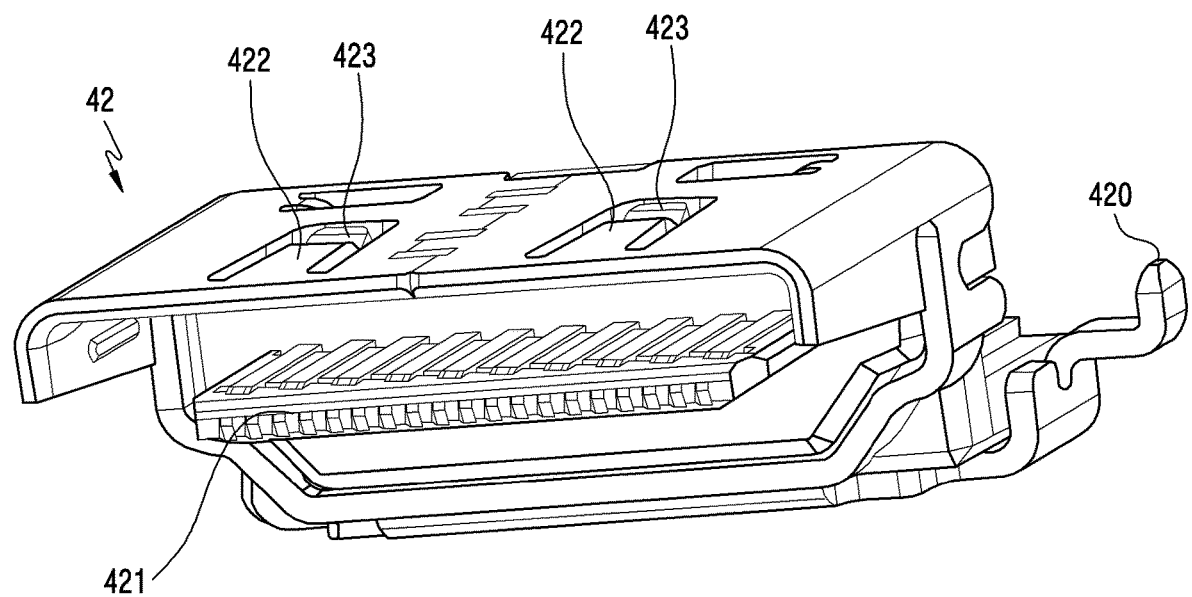
FIG. 7A and FIG. 7B are perspective views respectively illustrating a first metal member according to various embodiments of the present invention.
Figure 7B:
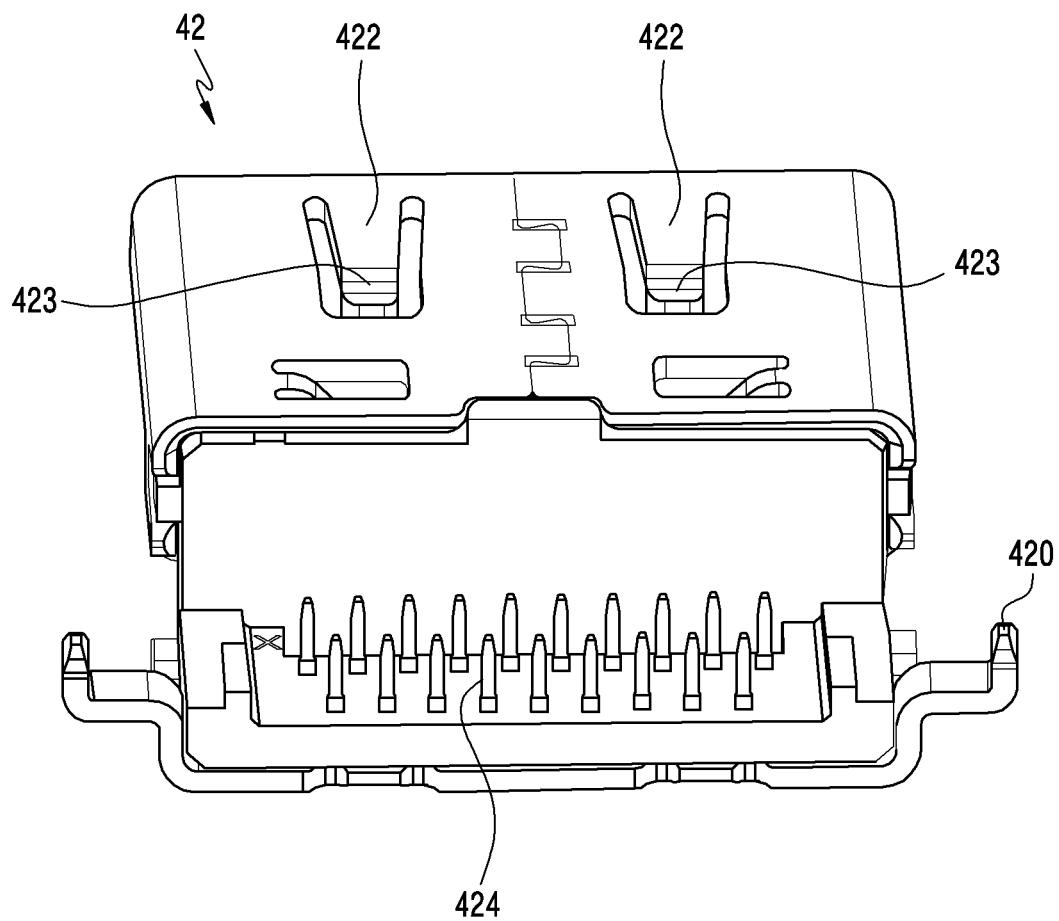

FIG. 7A and FIG. 7B are perspective views respectively illustrating the first metal member 42 according to various embodiments of the present invention.

Referring to FIG. 7A and FIG. 7B, according to various embodiments, the first metal member 42 is a connection part at which the receptacle 40 is soldered to the printed circuit board arranged inside the housing 110. The first metal member 42 may include a protruding connection part 421, first spring fingers 422, fixing dips 420, and a plurality of connection pins 424. According to various embodiments, the plurality of connection pins 424 may be signal pins through which electrical signals are transmitted, and the fixing dips 420 may be a fixing pin capable of fixing the first metal member 42 to the printed circuit board. According to various embodiments, the fixing dip 420 may be electrically connected to the first spring finger 422, and the plurality of connection pins 424 may not be electrically connected to the first spring finger 422 (e.g., may be electrically disconnected from the first spring finger 422). In an embodiment, the plurality of connection pins 424 is exposed to outside the first metal member 42 in a direction opposite to the direction away from the external device connector hole 108. Here, the printed circuit board which is inside the housing 110, is electrically connected to the receptacle 40 at the plurality of connection pins 424.

According to various embodiments, the first metal member 42 may have the at least one or more first spring fingers 422 protruding in a first direction (e.g., upward direction), the protruding connection part 421 positioned to face a connector hole 108 in the side member 103 (shown in FIG. 1), and the plurality of connection pins 424 (e.g., DIP pins) arranged at a side of the first metal member 42 which is opposite to the side at which the protruding connection part 421 protrudes. That is, the protruding connection part 421 and the plurality of connection pins 424 may be exposed to outside the first metal member 42 at opposing sides thereof along the X direction. According to various embodiments, each connection terminal of the protruding connection part 421 may be electrically connected to each connection pin 424 in a point to point manner (e.g., one-to-one correspondence).

According to various embodiments, each of the first spring fingers 422 has a shape in which a free end 423 (e.g., a first distal end) is bent to have a shape protruding in a second direction (e.g., the second direction (②) shown in FIG. 3B). According to various embodiments, the first spring finger 422 may contact with the plug inserted at and connected to the protruding connection part 421 at an inner area of the first metal member 42. That is, since the distal end may protrude towards the inner area of the first metal member 42, the inserted plug may be contacted with the first spring finger 422 at the distal end thereof. The free end 423 of the first spring finger 422 may contact with the inserted plug, and enhance ground (GND) performance. For example, the plug which is inserted into the first metal member 42 may include a USB type-C plug or an HDMI plug.

According to various embodiments, the first spring finger 422 has a plate shape to define a plate spring, and may provide a force of adhering to the connected plug inserted in to the first metal member 42. That is, the plate spring may be biased towards the inner area of the first metal member 42 to provide a force by which the first spring finger 422 contacts or engages with the inserted plug.

Figure 8:
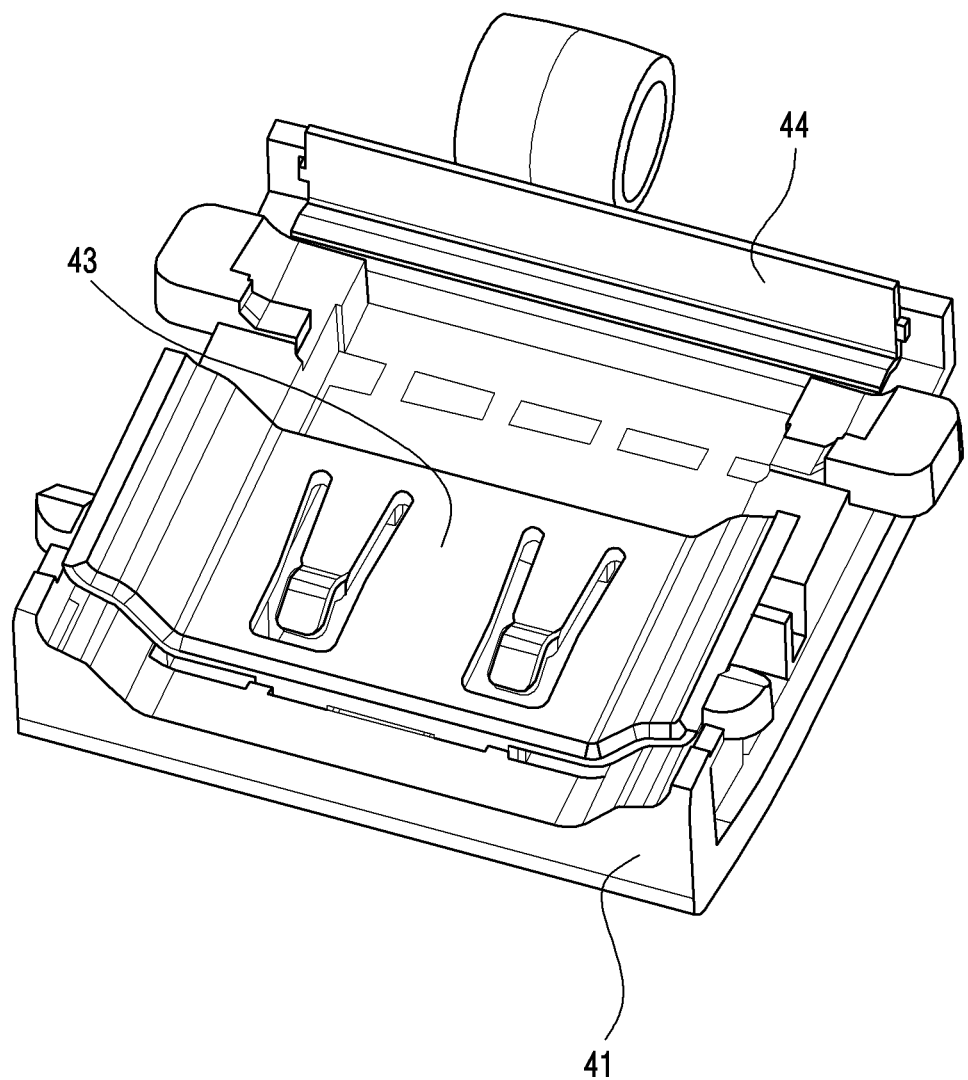
FIG. 8 is a perspective view illustrating second and third metal members coupled to a door cover of a receptacle according to various embodiments of the present invention.
Figure 9:
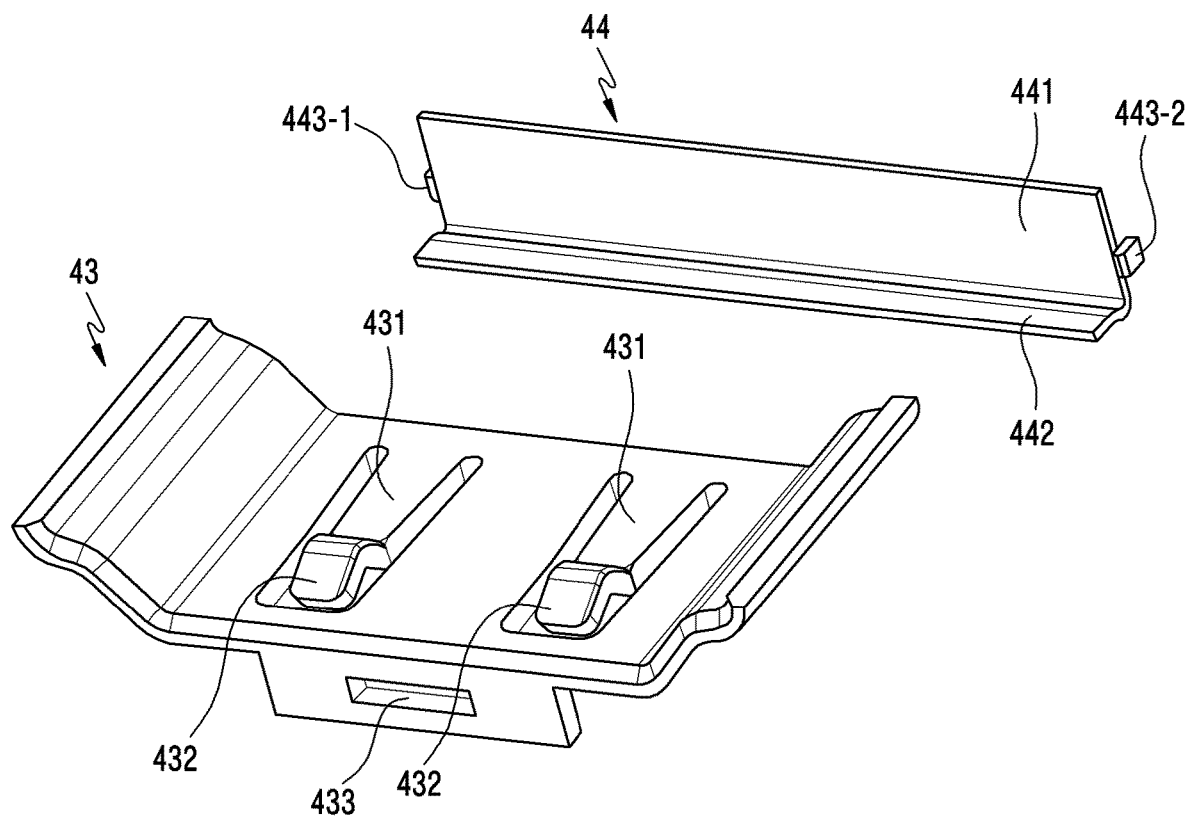
FIG. 9 is an exploded perspective view illustrating second and third metal members according to various embodiments of the present invention.

FIG. 8 is a perspective view illustrating a state in which the second and third metal members 43 and 44 are coupled to the door cover 41 according to various embodiments of the present invention. FIG. 9 is a perspective view respectively illustrating the second and third metal members 43 and 44 separated from each other according to various embodiments of the present invention.

Referring to FIG. 8 and FIG. 9, according to various embodiments, the second metal member 43 may include at least one or more second spring fingers 431, and at least one or more hooking holes 433. According to various embodiments, when the plug is inserted into the receptacle 40 and connected at the protruding connection part 421 thereof, the second metal member 43 may support an inserted state of the plug, and include the at least one or more second spring fingers 431 for connection stability with the plug.

According to various embodiments, the second spring finger 431 has a shape in which the free end 432 (e.g., a second distal end) is bent to protrude in a first direction (①) (shown in FIG. 3B). According to various embodiments, the second spring finger 431 may be coupled with the plug connected to the protruding connection part 421. The free end 432 of the second spring finger 431 may be inserted into a locking groove 51 (shown in FIG. 12B) of the plug.

According to various embodiments, the hooking hole 433 may be coupled to or engaged with a hooking protrusion 414-1 (shown in FIG. 6) of the door cover 41, and fix the second metal member 43 to the door cover 41.

According to various embodiments, the third metal member 44 may be arranged in contact with the first metal member 42, and reinforce GND and enhance EMI/ESD shielding. According to various embodiments, the third metal member 44 may be coupled to the door cover 41 at a rear thereof, in a standing type state. According to various embodiments, the third metal member 44 may include a standing type portion 441 (e.g., a first plate portion), and a bottom portion 442 (e.g., a second plate portion) bent from the standing type portion 441 and spaced apart from the first metal member 42 along the thickness direction. According to various embodiments, the bottom portion 442 may always maintain a contact state with the first metal member 42 by an elastic force thereof.

According to various embodiments, when the plug is inserted into the receptacle 40, the standing type portion 441 of the third metal member 44 may serve to restrict further rotation of the door cover 41 which is open, and may be responsible for a function capable of providing elasticity (e.g., a biasing force) by which the bottom portion 442 may contact with the first metal member 42.

According to various embodiments, the standing type portion 441 may provide an elastic force for insertion and non-insertion (e.g., removal) of the plug to and from the receptacle 40. According to various embodiments, the bottom portion 442 may be maintained in contact with the first metal member 42.

According to various embodiments, the third metal member 44 may have first and second fixing protrusions 443-1 and 443-2 formed at each of opposing ends of the third metal member 44 along the Y direction. The third metal member 44 may be fixed to a standing type part 416 (shown in FIG. 6) of the door cover 41 by engagement of the first and second fixing protrusions 443-1 and 443-2 with respective fixing holes of the support wall 416. For example, taking FIGS. 5, 6 and 8 together, the first and second fixing protrusions 443-1 and 443-2 may be inserted into respective fixing holes formed in the standing type part of the door cover 41.

Although not shown in the drawings, the second and third metal members 43 and 44 may be integrally manufactured into a single unitary component and be coupled to the door cover 41 as the unitary component combining the structures of the second and third metal members 43 and 44 described above. The integrated structure of the second and third metal members 43 and 44 into a unitary structure may further enhance EMI/ESD shielding.

Figure 10:
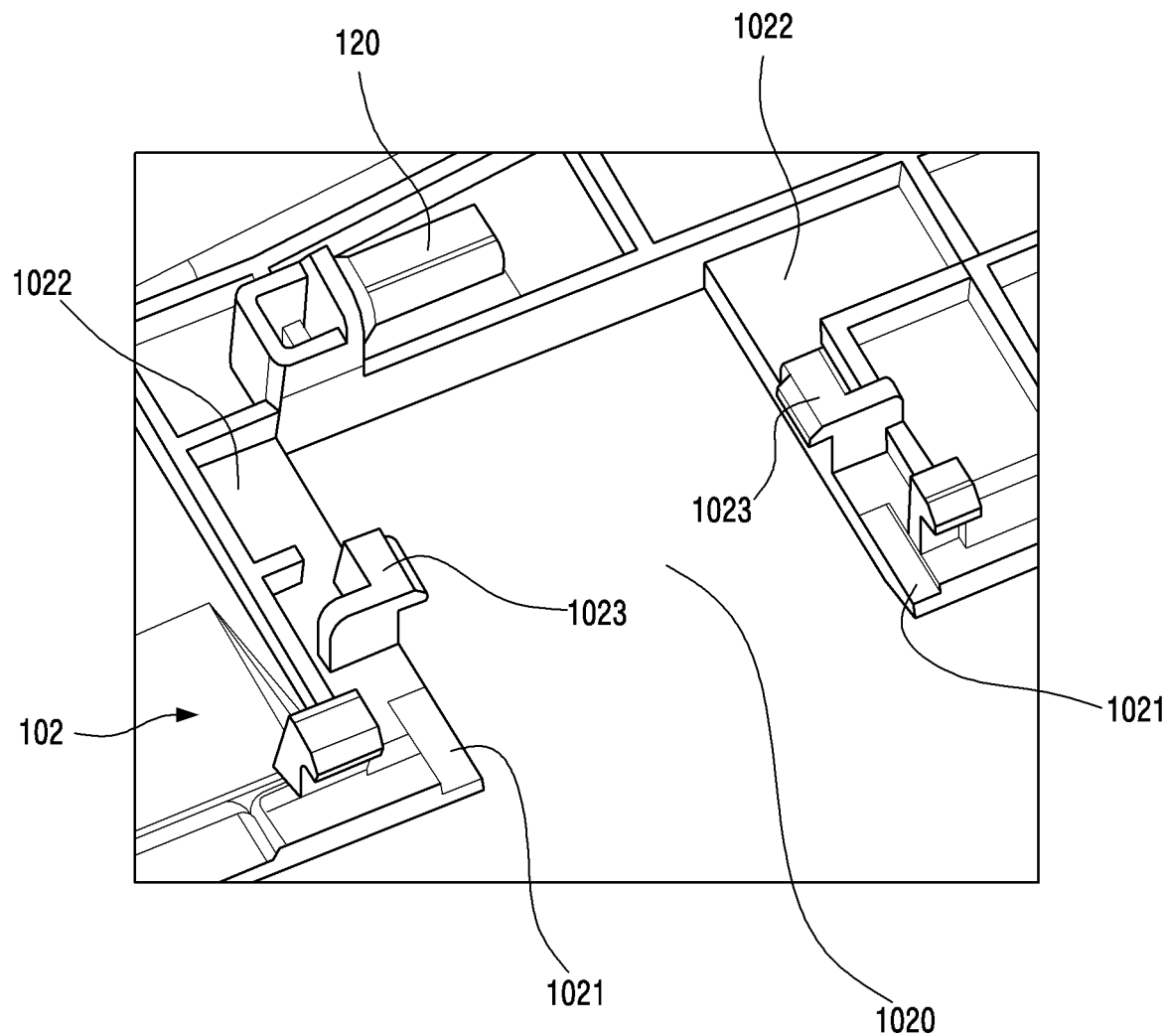
FIG. 10 is a perspective view illustrating a rear cover on which a receptacle according to various embodiments of the present invention is arranged.

FIG. 10 is a perspective view illustrating a rear cover 102 on which the receptacle 40 is arrangeable according to various embodiments of the present invention.

Referring to FIG. 10, according to various embodiments, a part of the rear cover 102 at which the door cover 41 is rotatably arranged may include (or define) an opening 1020, the hinge 120, over-rotation prevention portions 1021 and 1022, and at least one or more door locking protrusions 1023. According to various embodiments, the opening 1020 is a space or recess in the rear cover 102 for accommodating the door cover 41. The opening 1020 may be open in a direction toward a connector hole 108 of the housing 110 (shown in FIG. 1).

According to various embodiments, the rear cover 102 may have a pair of first over-rotation prevention portions 1021 and a pair of second over-rotation prevention portions 1022 arranged along the periphery of the opening 1020, where the first over-rotation prevention portions 1021 are closer to the opening of the recess than the second over-rotation prevention portions 1022 along the Y direction. The door locking protrusions 1023 are respectively arranged between the corresponding over-rotation prevention portions 1021 and 1022, along the Y direction.

According to various embodiments, before the plug 50 is inserted into the receptacle 40 or when the door cover 41 is closed, the door locking protrusion 1023 may be engaged with a normal position hooking part among the normal position hooking parts 417-1 and 417-2 shown in FIG. 6 of the door cover 41, such that the further movement of the door cover 41 in the first direction may be prevented. In an embodiment, over-rotation of the door cover 41 in a direction toward the first metal member 42 is restricted by engagement of the hooking protrusions (the normal position hooking parts 417-1 and 417-2) of the door cover 41 with the door locking protrusions 1023 of the rear cover 102.

According to various embodiments, the rear cover 102 may have the hinge 120 to which a hinge arm 415 (shown in FIG. 6) of a door cover 41 is rotatable coupled, by insertion of the hinge 120 into the hinge arm 415.

Figure 11A:
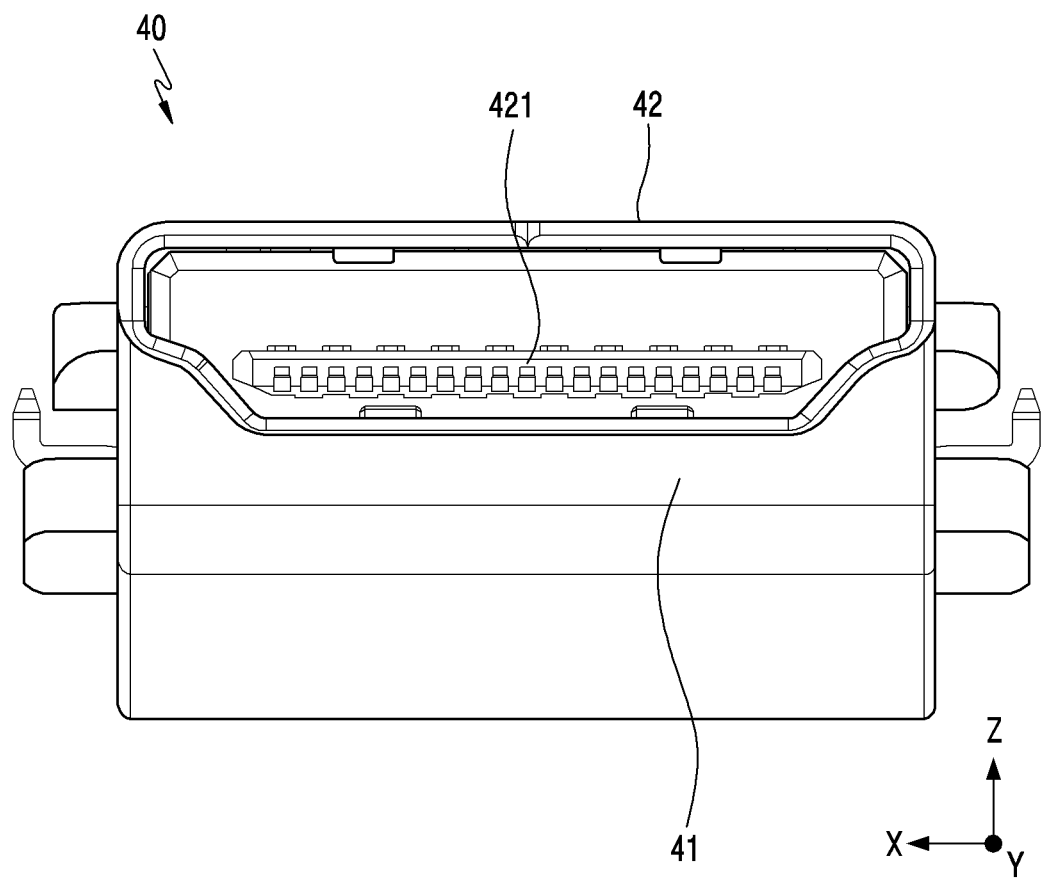
FIG. 11A is a front cross-sectional view illustrating a receptacle when a plug is not inserted according to various embodiments of the present invention.
Figure 11B:
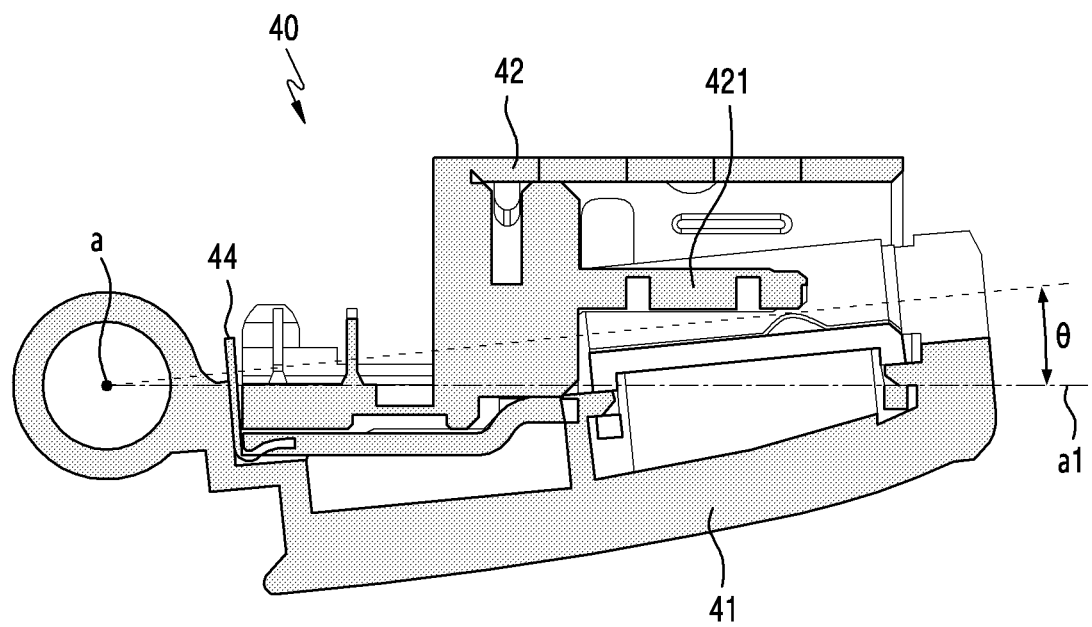
FIG. 11B is a cross-sectional side view illustrating a receptacle when a plug is not inserted according to various embodiments of the present invention.

FIG. 11A is a front cross-sectional view illustrating the receptacle 40 when the plug is not inserted (or not insertable) into the receptacle 40 according to various embodiments of the present invention. FIG. 11B is a cross-sectional side view illustrating the receptacle 40 when the plug is not inserted according to various embodiments of the present invention.

Referring to FIG. 11A and FIG. 11B, according to various embodiments, in a state in which the plug is not inserted into the receptacle 40, the door cover 41 may be in a state of being closest to the first metal member 42 along the Z direction (e.g., thickness direction). The door cover 41 which is closest to the first metal member 42 is closed. According to various embodiments, the door cover 41 may be in a state of being rotatable around the hinge axis (a) by approximately a first angle (θ), for example, about 5 degrees with respect to a horizontal axis (a1) (e.g., a reference axis or reference X-Y plane). The first angle (θ) does not need to be limited to 5 degrees, and may be about 10 degrees. The door cover 41 may receive a rotational force in a first direction (e.g., the first direction (①) shown in FIG. 4) by an elastic body 1024, for example, a rubber. In an embodiment, the elastic body 1024 such as the rubber may provide a biasing force in the first direction to maintain the door cover 41 being closed (e.g., closest to the first metal member 42 along the thickness direction). That is, the receptacle 40 which is closed includes the door cover 41 closest to the first metal member 42.

According to various embodiments, in a state in which the door cover 41 is closed, at least a portion of the protruding connection part 421 may be covered by the door cover 41 to be invisible from outside of the receptacle 40. That is, receptacle 40 which closed by the door cover 41 includes the protruding connection part 421 covered and not exposed to outside the receptacle 40. For example, when the rotation angle (00) of the door cover 41 is about 10 degrees, an entirety of the protruding connection part 421 may be covered by the door cover 41. In an embodiment, when the rotation angle (θ) of the door cover 41 is about 10 degrees or less relative to the reference plane, an entirety of the protruding connection part 421 may be covered by the door cover 41 such that the protruding connection part 421 at an inner area of the receptacle 40 is minimally or non-exposed to outside the receptacle 40.

In an embodiment, referring to FIGS. 3B and 11B, within the receptacle 40, the door cover 41 faces the first metal member 42 along a thickness direction (e.g., Z direction) of the receptacle 40. Each of the door cover 41 and the first metal member 42 has a thickness along the thickness direction, and the receptacle 40 which is closed includes the thickness of the door cover 41 overlapping the thickness of the first metal member 42.

According to various embodiments, the third metal member 44 may always maintain (e.g., shown in FIG. 12B) a state of being connected to the first metal member 42 regardless of whether the door cover 41 rotates to be open or is minimally rotated to be closed.

Figure 12A:
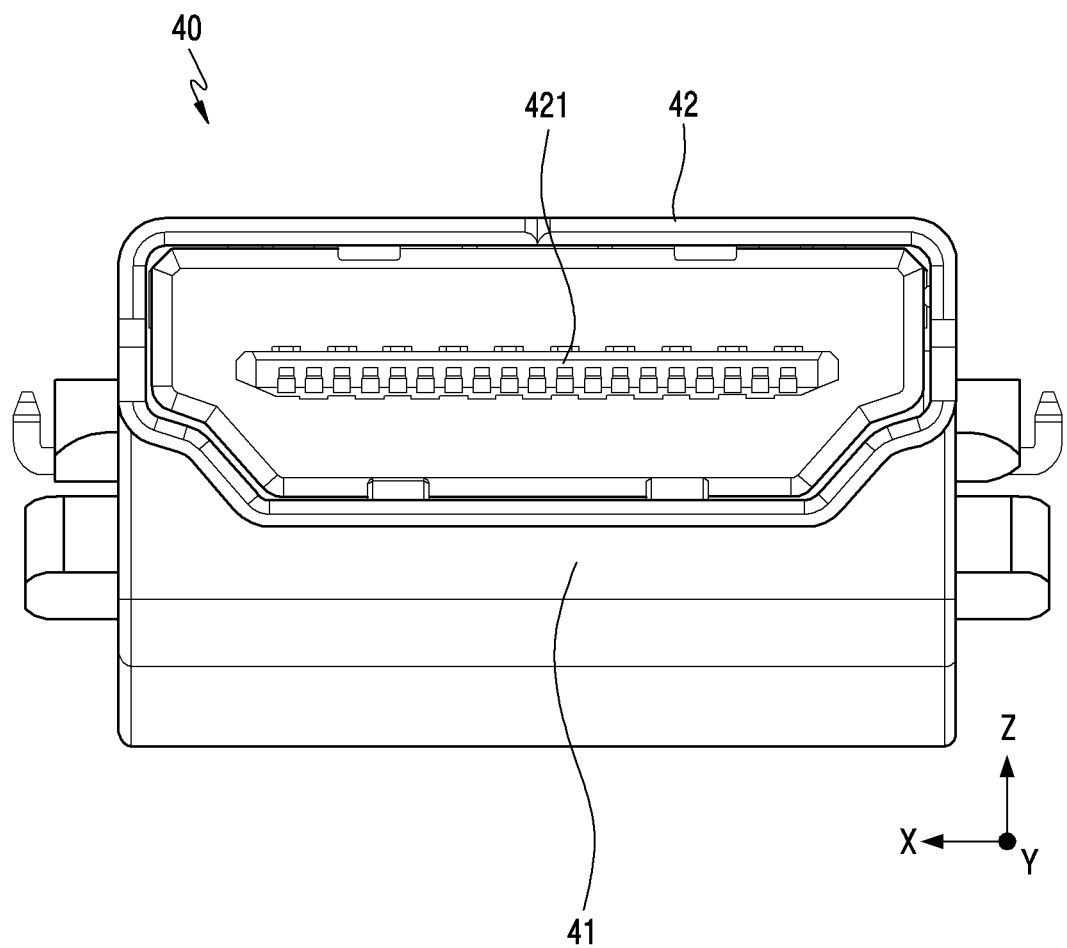
FIG. 12A is a front cross-sectional view illustrating a receptacle when a plug is inserted according to various embodiments of the present invention.
Figure 12B:
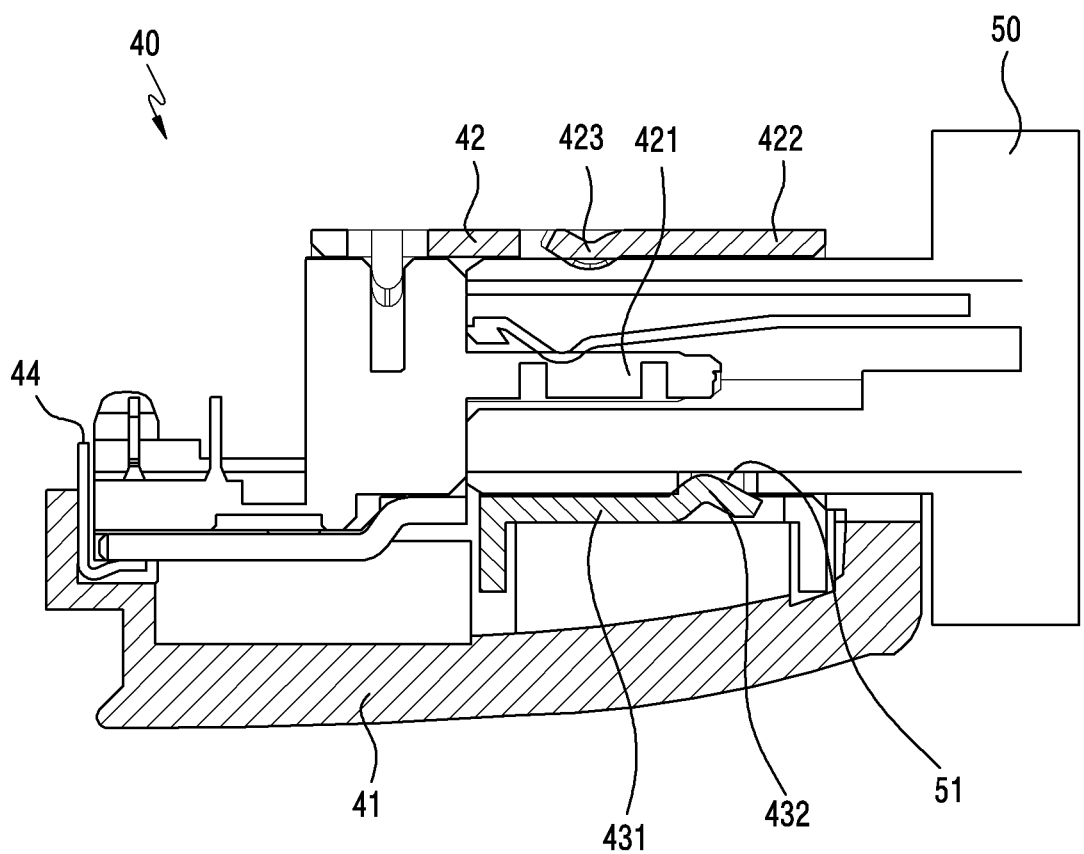
FIG. 12B is a cross-sectional side view illustrating a receptacle when a plug is inserted according to various embodiments of the present invention.
Figure 12C:
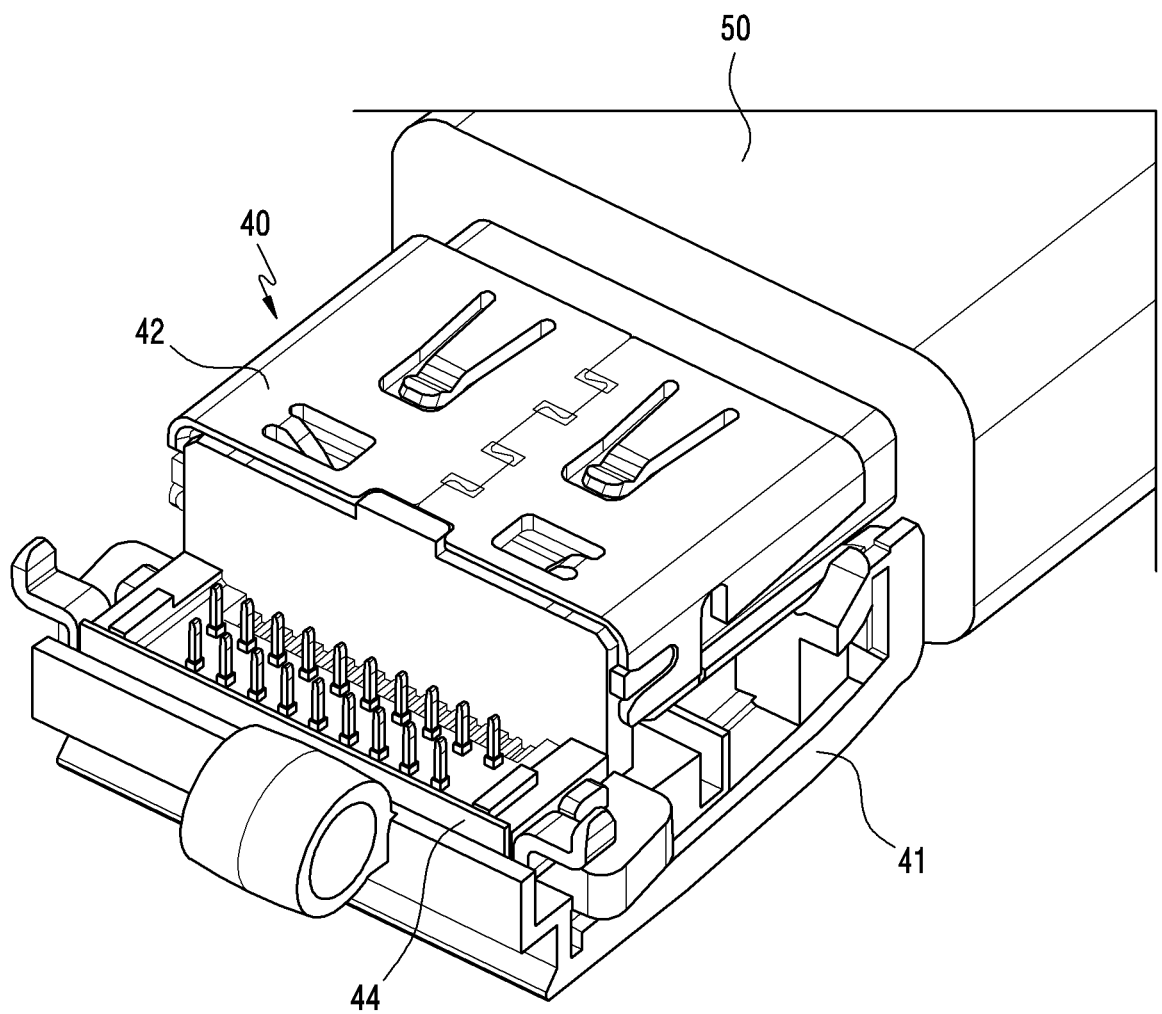
FIG. 12C and FIG. 12D are perspective views respectively illustrating a receptacle into which a plug is inserted according to various embodiments of the present invention.
Figure 12D:
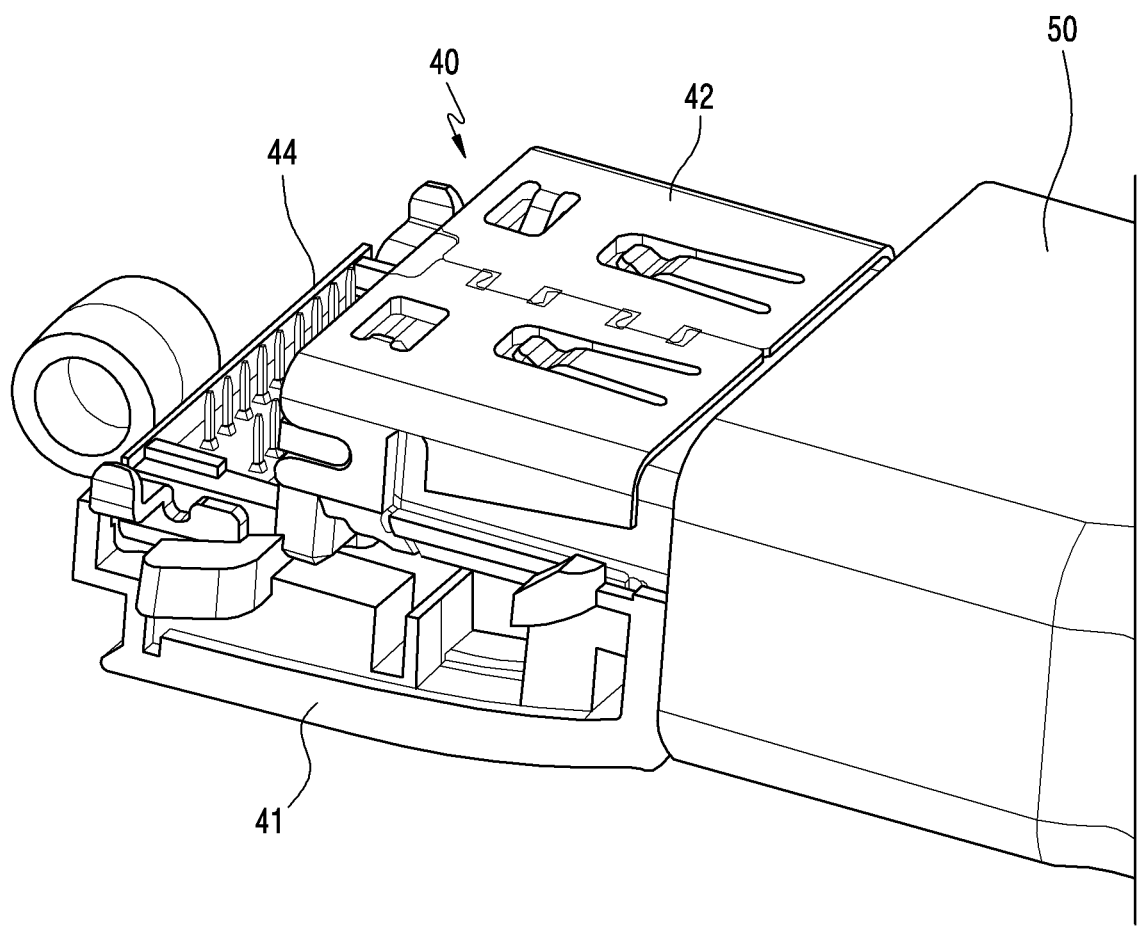

FIG. 12A is a front cross-sectional view illustrating the receptacle 40 when the plug 50 is insertable into the receptacle 40 according to various embodiments of the present invention. FIG. 12B is a cross-sectional view illustrating the receptacle 40 when the plug 50 is inserted into the receptacle 40 according to various embodiments of the present invention. FIG. 12C and FIG. 12D are perspective views respectively illustrating the receptacle 40 having the plug 50 inserted according to various embodiments of the present invention.

Referring to FIG. 12A to FIG. 12D, according to various embodiments, when the door cover 41 is rotated about the hinge axis (a) toward a second direction (e.g., the second direction (②) shown in FIG. 3B) in order for the plug 50 to be insertable into the receptacle 40, the plug 50 may be inserted into the receptacle 40. For example, where portions of the door cover 41 are above fixing dips 420 of the first metal member 42 in FIG. 11A (e.g., closed door cover), the same portions are below the fixing dips 420 in FIG. 12A (e.g., open door cover), along the Z direction.

According to various embodiments, when the plug 50 is inserted into the receptacle 40, a connection terminal of the plug 50 may be connected to the protruding connection part 421 and maintain a connected state with the first metal member 42. Here, the door cover 41 which is open may be parallel to a horizontal axis (e.g., the horizontal axis (a1) shown in FIG. 11B), and may be parallel to a bottom surface of a rear cover 102.

According to various embodiments, the door cover 41 may be prevented from further rotating in the second direction (②) by engagement of the front and rear over-rotation prevention hooking protrusions 411-1, 411-2, 412-1 and 412-2 of the door cover 41 with may a portion (not shown) of the rear cover 102 as described above.

Taking FIG. 11B together with FIG. 12B, for example, the second metal member 43 is between the first metal member 42 and the door cover 41, coupled to the door cover 41 and moveable together with the door cover 41. The receptacle 40 which is open (FIG. 12B) includes the door cover 41 and the second metal member 43 together moved away from the first metal member 42, together with the protruding electrical connection part 421 connectable to the external device plug 50.

Figure 13:
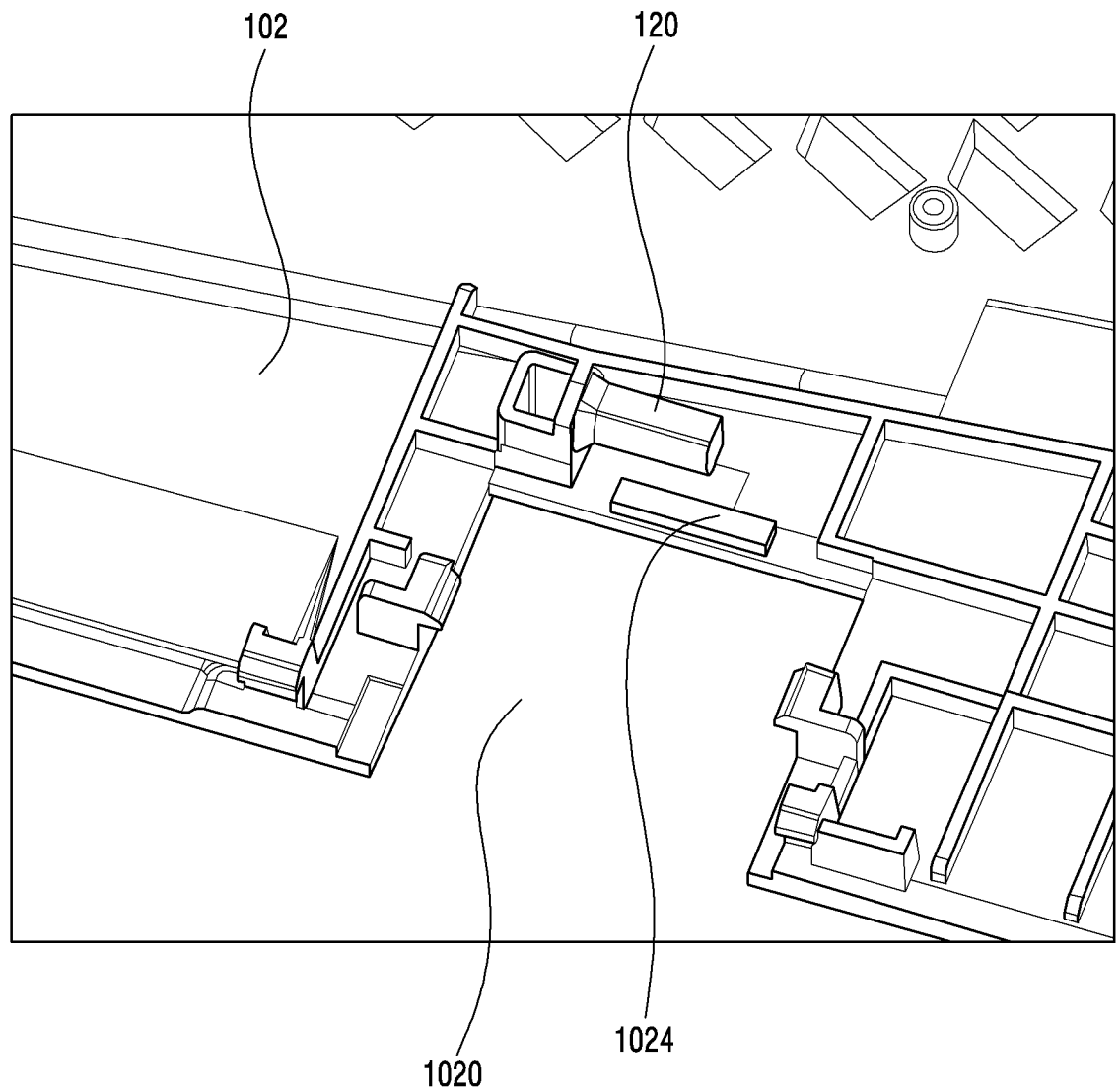
FIG. 13 is a perspective view illustrating a state in which an elastic body is arranged on a rear cover according to various embodiments of the present invention.

FIG. 13 is a perspective view illustrating a state in which an elastic body 1024 is arranged on a rear cover 102 according to various embodiments of the present invention.

Referring to FIG. 13, according to various embodiments, when an inserted plug (e.g., the plug 50 shown in FIG. 12C) is separated from a receptacle 40 (shown in FIG. 11A), a door cover 41 (shown in FIG. 11B) may rotate by a first angle (θ) (shown in FIG. 11B) by a biasing force provided by the elastic body 1024, and return to an original position. The original position of the door cover 41 may be a closed position (refer to FIGS. 11A and 11B).

According to various embodiments, the elastic body 1024 may be attached to the rear cover 102, be arranged near the hinge 120, and be arranged closer to the opening 1020 than the hinge 120 along the Y direction. According to various embodiments, when the rear cover 102 is viewed from the above (e.g., plan view or view of X-Y plane), the elastic body 1024 may be positioned between the hinge 120 and the opening 1020. Taking FIGS. 4 and 13 together, the elastic body 1024 is between the door cover 41 and the rear cover 102 along the thickness direction. For example, a portion of the door cover 41 which corresponds to the bottom portion 442 of the third metal member 44 may overlap the elastic body 1024, without being limited thereto.

According to various embodiments, the elastic body 1024 may be arranged between the rear cover 102 and a door cover 41 shown in FIG. 11B. For example, the elastic body 1024 which is compressible, may be compressed according to rotation of the door cover 41 shown in FIG. 11B, or a compressed state may be released when the door cover 41 is opened.

According to various embodiments, when the plug 50 (shown in FIG. 12C) is inserted into the receptacle 40, the elastic body 1024 may be in a state of being compressed by the door cover 41 which is open. Conversely, when the plug is separated from the receptacle 40 and the door cover 41 is closed, the elastic body 1024 may provide a rotational force to the door cover 41 while the compressed state is released and the elastic body 1024 returns to an uncompressed shape or thickness. For example, the elastic body 1024 may be a discrete shape or pattern, and may be a rubber material having elasticity.

According to various embodiments, an electronic device (e.g., the electronic device 10 shown in FIG. 1) may include a housing (e.g., the housing 110 shown in FIG. 1) which includes a front cover (e.g., the front cover 101 shown in FIG. 1) arranged to face a first direction (e.g., the first direction (①) shown in FIG. 1), a rear cover (e.g., the rear cover 102 shown in FIG. 1) arranged to face a second direction (e.g., the second direction (②) shown in FIG. 1) opposite to the first direction, a side member (e.g., the side member 103 shown in FIG. 1) arranged to surround at least a part of the space between the front and rear covers and including a connector hole, and a receptacle (e.g., the receptacle 40 shown in FIG. 4) at least a portion of which is rotatably assembled on the rear cover (e.g., the rear cover 102 shown in FIG. 1), and which is arranged at an entrance of the connector hole. The receptacle (e.g., the receptacle 40 shown in FIG. 4) may include a first metal member (e.g., the first metal member 42 shown in FIG. 4) including a plurality of connection pins, and including a protruding connection part (e.g., the protruding connection part 421 shown in FIG. 5) connected to a plug (e.g., the plug 50 shown in FIG. 12C), a door cover (e.g., the door cover 41 shown in FIG. 4) which is arranged to face the first metal member (e.g., the first metal member 42 shown in FIG. 4), and rotates towards the second direction around a hinge axis when the plug (e.g., the plug 50 shown in FIG. 12C) is connected to the protruding connection part (e.g., the protruding connection part 421 shown in FIG. 5), and rotates towards the first direction around the hinge axis when the connected plug (e.g., the plug 50 shown in FIG. 12C) becomes separated, and a second metal member (e.g., the second metal member 43 shown in FIG. 4) which faces the first metal member (e.g., the first metal member 42 shown in FIG. 4), and is coupled to the door cover (e.g., the door cover 41 shown in FIG. 4).

According to various embodiments, the first metal member (e.g., the first metal member 42 shown in FIG. 4) may further include at least one or more first spring fingers (e.g., the first spring finger 422 shown in FIG. 5) formed to reinforce GND, and the first spring finger (e.g., the first spring finger 422 shown in FIG. 5) may have a shape in which a free end is bent, and have a shape of protruding in the second direction.

According to various embodiments, the door cover (e.g., the door cover 41 shown in FIG. 4) may protect at least a portion of the protruding connector part (e.g., the protruding connector part 421 shown in FIG. 5), when the plug (e.g., the plug 50 shown in FIG. 12C) is not inserted into the receptacle (e.g., the receptacle 40 shown in FIG. 4).

According to various embodiments, the free end of the first spring finger (e.g., the first spring finger 422 shown in FIG. 5) may contact with the plug (e.g., the plug 50 shown in FIG. 12C), when the plug (e.g., the plug 50 shown in FIG. 12C) is connected to the receptacle (e.g., the receptacle 40 shown in FIG. 4).

According to various embodiments, the second metal member (e.g., the second metal member 43 shown in FIG. 4) may further include at least one or more second spring fingers (e.g., the second spring finger 431 shown in FIG. 5) for locking and connection stability of the plug (e.g., the plug 50 shown in FIG. 12C).

According to various embodiments, the second spring finger (e.g., the second spring finger 431 shown in FIG. 5) may have a shape in which a free end is bent, and have a shape of protruding in the first direction.

According to various embodiments, the plug (e.g., the plug 50 shown in FIG. 12C) may further include a locking groove (e.g., the locking groove 51 shown in FIG. 12C) into which the second spring finger (e.g., the second spring finger 431 shown in FIG. 5) is inserted.

According to various embodiments, the door cover (e.g., the door cover 41 shown in FIG. 4) may further include a third metal member (e.g., the third metal member 44 shown in FIG. 5) spaced apart from the first metal member (e.g., the first metal member 42 shown in FIG. 4), for GND and/or EMI shielding.

According to various embodiments, the third metal member (e.g., the third metal member 44 shown in FIG. 5) may be adjacent to the plurality of connection pins (e.g., the connection pins 424 shown in FIG. 7B), and be arranged in a standing type at a rear end of the door cover (e.g., the door cover 41 shown in FIG. 4).

According to various embodiments, the third metal member (e.g., the third metal member 44 shown in FIG. 5) may include a standing type portion (e.g., the standing type portion 441 shown in FIG. 9), and a bottom portion (e.g., the bottom portion 442 shown in FIG. 9) bent from the standing type portion (e.g., the standing type portion 441 shown in FIG. 9). The bottom portion (e.g., the bottom portion 442 shown in FIG. 9) may be spaced apart from the first metal member (e.g., the first metal member 42 shown in FIG. 4).

According to various embodiments, the door cover (e.g., the door cover 41 shown in FIG. 4) may include one or more hooking protrusions (e.g., the hooking protrusions 411-1, 411-2, 412-1, and 412-2 shown in FIG. 6) for preventing an excessive rotation operation, and the hooking protrusions (e.g., the hooking protrusions 411-1, 411-2, 412-1, and 412-2 shown in FIG. 6) may protrude in a direction of becoming distant from each other.

According to various embodiments, the door cover (e.g., the door cover 41 shown in FIG. 4) may be rotatably coupled to a hinge formed on the rear cover (e.g., the rear cover 102 shown in FIG. 1), and rotate limitedly about the hinge in a state of being accommodated in an opening formed in the rear cover (e.g., the rear cover 102 shown in FIG. 1).

According to various embodiments, the rotation of the hooking protrusions (e.g., the hooking protrusions 411-1, 411-2, 412-1, and 412-2 shown in FIG. 6) may be restricted by interlocking with a portion of a circumference of the opening of the rear cover (e.g., the rear cover 102 shown in FIG. 1).

According to various embodiments, the electronic device may further include an elastic body (e.g., the elastic body 1024 shown in FIG. 13) attached to the rear cover, arranged at the circumference of the opening (e.g., the opening 1020 shown in FIG. 13), arranged between the hinge (e.g., the hinge 120 shown in FIG. 13) and the opening when the rear cover (e.g., the rear cover 102 shown in FIG. 13) is viewed from the above, and arranged between the door cover (e.g., the door cover 41 shown in FIG. 4) and the rear cover.

According to various embodiments, one surface of the door cover (e.g., the door cover 41 shown in FIG. 4) facing the second direction may be arranged to be exposed to the rear cover (e.g., the rear cover 102 shown in FIG. 1).

According to various embodiments, a receptacle (e.g., the receptacle 40 shown in FIG. 4) of an electronic device (e.g., the electronic device 10 shown in FIG. 1) may include a first metal member (e.g., the first metal member 42 shown in FIG. 4) including a plurality of connection pins, and including a protruding connection part (e.g., the protruding connection part 421 shown in FIG. 5) connected to a plug (e.g., the plug 50 shown in FIG. 12C), a door cover (e.g., the door cover 41 shown in FIG. 4) which is arranged to face the first metal member (e.g., the first metal member 42 shown in FIG. 4), and rotates downward when the plug (e.g., the plug 50 shown in FIG. 12C) is connected to the protruding connection part (e.g., the protruding connection part 421 shown in FIG. 5), and rotates upward when the connected plug (e.g., the plug 50 shown in FIG. 12C) becomes separated, a second metal member (e.g., the second metal member 43 shown in FIG. 4) coupled to the door cover (e.g., the door cover 41 shown in FIG. 4), and a third metal member (e.g., the third metal member 44 shown in FIG. 5) arranged at the rear of the door cover (e.g., the door cover 41 shown in FIG. 4), and spaced apart from the first metal member (e.g., the first metal member 42 shown in FIG. 4). The third metal member (e.g., the third metal member 44 shown in FIG. 5) may include a standing type portion (e.g., the standing type portion 441 shown in FIG. 9) providing an elastic force of an insertion/non-insertion operation of the plug (e.g., the plug 50 shown in FIG. 12C), and a bottom portion (e.g., the bottom portion 442 shown in FIG. 9) maintaining a contact force with the first metal member (e.g., the first metal member 42 shown in FIG. 4), and bent from the standing type portion (e.g., the standing type portion 441 shown in FIG. 9).

According to various embodiments, the first metal member (e.g., the first metal member 42 shown in FIG. 4) may include at least one or more first spring fingers (e.g., the first spring finger 422 shown in FIG. 5) formed to reinforce GND, and the first spring finger (e.g., the first spring finger 422 shown in FIG. 5) may have a shape in which a free end is bent, and have a shape in which the free end protrudes downward.

According to various embodiments, the second metal member (e.g., the second metal member 43 shown in FIG.

4) may include at least one or more second spring fingers (e.g., the second spring finger 431 shown in FIG. 5) for locking of the plug (e.g., the plug 50 shown in FIG. 12C) and EMI shielding, and the second spring finger (e.g., the second spring finger 431 shown in FIG. 5) may have a shape in which a free end is bent, and have a shape in which the free end protrudes upward.

According to various embodiments, the third metal member (e.g., the third metal member 44 shown in FIG. 5) may be adjacent to the plurality of connection pins (e.g., the connection pins 424 shown in FIG. 7B), and be arranged in a standing type at a rear end of the door cover (e.g., the door cover 41 shown in FIG. 4).

According to various embodiments, the third metal member (e.g., the third metal member 44 shown in FIG. 5) may be a SUS material, and be installed for GND and/or EMI shielding, and the bottom portion (e.g., the bottom portion 442 shown in FIG. 9) may be spaced apart from the first metal member (e.g., the first metal member 42 shown in FIG. 4).

Various embodiments of the present disclosure disclosed in the present specification and drawings are only presented as specific examples to easily explain the technical content of the present disclosure and help understanding of the present disclosure, and are not intended to limit the scope of the present disclosure. Therefore, the scope of the present disclosure should be construed as including all changes or modified forms derived based on the technical spirit of the present disclosure in addition to the embodiments disclosed herein.

What is claimed is:

1. An electronic device comprising:
    a housing comprising:
        a front face,
        a rear face opposite to the front face, and
        a side face disposed to surround at least a portion of a space between the front face and the rear face, the side face including a connector hole defined therein; and
    a receptacle disposed at an entrance of the connector hole and having an opened state and a closed state, the receptacle comprising:
        a first metal member comprising a protruding electrical connection part configured to connect to an external plug; and
        a door cover facing the first metal member and rotatably coupled to the housing;
        a metal member coupled to a rear portion of the door cover such that the metal member moves according to a rotation of the door cover, wherein the metal member is configured to electrically connect to a ground of the electronic device by contacting with the first metal member regardless of the rotation of the door cover,
    wherein the door cover is configured to rotate relative to the first metal member when the protruding electrical connection part is connected to the external plug, and
    wherein the receptacle is in the opened state when the door cover is rotated away from the first metal member and the protruding electrical connection part.

2. The electronic device of claim 1, wherein the first metal member further comprises a first spring finger including a grounding portion which protrudes toward the door cover.

3. The electronic device of claim 2, wherein the grounding portion of the first metal member is in contact with and electrically grounding the external plug.

4. The electronic device of claim 3, wherein the receptacle further comprises a second metal member which is coupled to the door cover and is between the first metal member and the door cover,
    wherein
        the second metal member comprises a second spring finger, and
        the external plug which is connected to the protruding electrical connection part of the receptacle includes the second spring finger engaged with the external plug.

5. The electronic device of claim 4, wherein the second spring finger includes a bent portion which protrudes towards the first metal member.

6. The electronic device of claim 5, wherein
    the external plug comprises a locking groove into which the second spring finger is inserted, and
    the second spring finger of the second metal member is engaged with the locking groove, together with the grounding portion of the first metal member in contact with and electrically grounding the external plug.

7. The electronic device of claim 1, wherein the receptacle is in the closed state when the door cover covers the protruding electrical connection part of the first metal member.

8. The electronic device of claim 1, wherein the metal member is in contact with the first metal member for providing electrical grounding or electromagnetic interference shielding.

9. The electronic device of claim 8, wherein the metal member is between the door cover and the first metal member, at a rear side of the door cover which is farthest from the entrance of the connector hole.

10. The electronic device of claim 9, wherein the metal member comprises:
    a plate portion at which the metal member is in contact with both the first metal member and the door cover; and
    a bottom portion which is extended bent from the plate portion and at which the metal member is spaced apart from the first metal member.

11. The electronic device of claim 1, wherein the door cover comprises hooking protrusions at opposing sides of the door cover and extending in directions opposite to each other.

12. The electronic device of claim 11, wherein
    the rear face defines a recess of the rear face which corresponds to the connector hole, a bottom of the recess being closest to the entrance of the connector hole, and
    the door cover is accommodated in the recess of the rear face and is rotatably connected to the rear face at the bottom of the recess.

13. The electronic device of claim 12, wherein over-rotation of the door cover in a direction away from the first metal member is restricted by engagement of the hooking protrusions of the door cover with an edge portion of the rear face which defines the recess.

14. The electronic device of claim 12, further comprising an elastic body attached to the rear face at an edge portion of the rear face which defines the recess,
    wherein
        the rear face comprises a hinge at the edge portion of the rear face,
        the door cover is rotatably connected to the rear face at the hinge, and the elastic body is between the hinge and the recess along the direction away from the connector hole, and is between the door cover and the rear face.

15. The electronic device of claim 1, wherein the door cover comprises:
an upper surface which faces the first metal member, and
a second surface which is opposite to the first surface and exposed to outside the rear face at the connector hole.

16. The electronic device of claim 1, wherein
within the receptacle, the door cover faces the first metal member along a thickness direction of the receptacle,
each of the door cover and the first metal member has a thickness along the thickness direction, and
the receptacle is in the closed state when the thickness of the door cover overlaps the thickness of the first metal member.

17. The electronic device of claim 1, wherein
the door cover comprises hooking protrusions at opposing sides of the door cover and extending in directions opposite to each other,
the rear face comprises door locking protrusions which respectively correspond to the hooking protrusions of the door cover, and
over-rotation of the door cover in a direction toward the first metal member is restricted by engagement of the hooking protrusions of the door cover with the door locking protrusions of the rear face.

18. The electronic device of claim 1, wherein
the receptacle further comprises a second metal member which is between the first metal member and the door cover, coupled to the door cover and moveable together with the door cover, and
the receptacle is in the open state when the door cover and the second metal member are together moved away from the first metal member, together with the protruding electrical connection part connectable to the external plug.

19. The electronic device of claim 1, wherein the first metal member further comprises a plurality of connection pins exposed to outside the first metal member in a direction opposite to the direction away from the connector hole.

20. The electronic device of claim 19, further comprising a printed circuit board within the housing,
wherein the printed circuit board is electrically connected to the receptacle at the plurality of connection pins.

* * * * *